United States Patent
Iyer et al.

(10) Patent No.: US 11,544,763 B2
(45) Date of Patent: Jan. 3, 2023

(54) SYSTEMS AND METHODS FOR PREDICTION OF ITEM QUANTITY

(71) Applicant: Walmart Apollo, LLC, Bentonville, AR (US)

(72) Inventors: Rahul Radhakrishnan Iyer, Santa Clara, CA (US); Shubham Gupta, Sunnyvale, CA (US); Praveenkumar Kanumala, Newark, CA (US); Stephen Dean Guo, Saratoga, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 69 days.

(21) Appl. No.: 16/778,905

(22) Filed: Jan. 31, 2020

(65) Prior Publication Data

US 2021/0241345 A1 Aug. 5, 2021

(51) Int. Cl.
  *G06Q 30/00* (2012.01)
  *G06Q 30/06* (2012.01)
  *G06F 3/0482* (2013.01)

(52) U.S. Cl.
  CPC ..... *G06Q 30/0631* (2013.01); *G06Q 30/0603* (2013.01); *G06Q 30/0633* (2013.01); *G06Q 30/0641* (2013.01); *G06F 3/0482* (2013.01)

(58) Field of Classification Search
  CPC ............... G06Q 30/0601–0645; G06F 3/0482
  USPC ................................................. 705/26.1–27.2
  See application file for complete search history.

(56) References Cited

U.S. PATENT DOCUMENTS

| | | |
|---|---|---|
| 8,909,626 B2 | 12/2014 | Park et al. |
| 10,235,711 B1 | 3/2019 | Koduvayur Viswanathan |
| 2004/0034568 A1* | 2/2004 | Sone .................. G06Q 30/0635 705/26.81 |

(Continued)

OTHER PUBLICATIONS

Cook, Robert L., and Michael S. Garver. "Subscription Supply Chains: The Ultimate Collaborative Paradigm." Mid - American Journal of Business 17.2 (2002): 37-45. ProQuest. Web. Jun. 2, 2021. (Year: 2002).*

(Continued)

*Primary Examiner* — Jeffrey A. Smith
*Assistant Examiner* — Kennedy Gibson-Wynn
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform acts of receiving a user identifier, receiving an item identifier, determining user item quantity information related to quantities of the item previously selected by the user, determining a respective household size for each user, and determining aggregate household item quantity information related to quantities of the item previously selected by an aggregate of users of the same household size. If a first threshold level of the quantity of transactions is met, a recommended quantity is based on the user item quantity information, and if not, the recommended quantity is based on the aggregate household item quantity information. The user interface of the electronic device is updated to notify the user of the recommended quantity. Other embodiments are disclosed herein.

20 Claims, 17 Drawing Sheets

(56) References Cited

U.S. PATENT DOCUMENTS

| | | | | |
|---|---|---|---|---|
| 2004/0034570 | A1* | 2/2004 | Davis | G06Q 30/0229 |
| | | | | 705/7.31 |
| 2006/0180357 | A1 | 8/2006 | Timings | |
| 2008/0270176 | A1 | 10/2008 | Andersen et al. | |
| 2016/0314518 | A1* | 10/2016 | Goodwin | G06F 19/00 |
| | | | | 705/2 |
| 2017/0032446 | A1* | 2/2017 | Merz | G06F 16/24575 |
| 2018/0101875 | A1* | 4/2018 | Kim | G06Q 30/0282 |
| 2019/0371162 | A1* | 12/2019 | Walker | G08C 17/02 |
| 2020/0334635 | A1* | 10/2020 | Busey | G06Q 20/102 |
| 2021/0027237 | A1* | 1/2021 | Klish | G06Q 10/087 |

OTHER PUBLICATIONS

Giordano, Claudia, Fabrizio Alboni, and Luca Falasconi. "Quantities, Determinants, and Awareness of Households' Food Waste in Italy: A Comparison between Diary and Questionnaires Quantities." Sustainability 11.12 (2019): n/a. ProQuest. Web. Mar. 18, 2022. (Year: 2019).*

Godfrey, Andrea Lynn. "A Product Segmentation Approach and its Relationship to Customer Segmentation Approaches and Recommendation System Approaches." Order No. 3271384 The University of Texas at Austin, 2007. Ann Arbor: ProQuest. Web. Aug. 25, 2022. (Year: 2007).*

Cheng et al., "Extracting Attributes for Recommender Systems Based on MEC Theory," 2018 3rd International Conference on Computer and Communication Systems (ICCCS), Apr. 27-30, 2018, 10.1109/CCOMS.2018.8463179, https://ieeexplore.ieee.org/document/8463179/metrics#metrics, 2018.

Jiang et al., "End-to-End Product Taxonomy Extension from Text Reviews," 2019 IEEE 13th International Conference on Semantic Computing (ICSC), Jan. 30-Feb. 1, 2019, DOI: 10.1109/ICOSC.2019.8665533, pp. 195-198, https://ieeexplore.ieee.org/document/8665533/citations?tabFilter=papers#fcitations, 2019.

Bing et al., "Unsupervised Extraction of Popular Product Attributes from E-Commerce Web Sites by Considering Customer Reviews," 2016, ACM Transactions on Internet Technology, vol. 16, Article 12, Apr. 2016, 17 pages, https://doi.org/10.1145/2857054, 2016.

Cardoso et al., "Product Characterisation Towards Personalisation: Learning Attributes from Unstructured Data to Recommend Fashion Products," arXiv:1803.07679v1 [stat.ML], Mar. 20, 2018, pp. 1-9, arXiv.org > stat > arXiv:1803.07679, 2018.

Ma et al., "End-to-End Sequence Labeling via Bi-Directional LSTM-CNNs-CRF," arXiv:1603.01354v5 [cs.LG], May 29, 2016, arXiv.org > cs > arXiv:1603.01354, pp. 1-12, 2016.

Majumder et al., "Deep Recurrent Neural Networks for Product Attribute Extraction in eCommerce," pp. 1-7, arXiv:1803.11284v1 [cs.CL], Mar. 29, 2018, arXiv.org > cs > arXiv:1803.11284, 2018.

Nobari et al., "Query Understanding via Entity Attribute Identification," arXiv:1809.08566v1 [cs.IR], Sep. 23, 2018, arXiv.org > cs > arXiv:1809.08566, 2018.

Sawant et al., "Product Discovery From E-Commerce Listings via Deep Text Parsing," CoDS-COMAD '18 Proceedings of the ACM India Joint International Conference on Data Science and Management of Data, Jan. 11-13, 2018, pp. 1-10, https://doi.org/10.1145/3152494.3152503, 2018.

Zheng et al., "OpenTag: Open Attribute Value Extraction from Product Profiles," Proceedings of the 24th ACM SIGKDD International Conference on Knowledge Discovery and Data Mining (2018), arXiv:1806.01264v2 [cs.CL], Oct. 6, 2018, arXiv.org > cs > arXiv:1806.01264, pp. 1-10, 2018.

Sun et al., "Important Attribute Identification in Knowledge Graph," arXiv:1810.05320v1 [cs.CL], Oct. 12, 2018, arXiv.org > cs > arXiv:1810.05320, pp. 1-13, 2018.

* cited by examiner

400

401 — Receiving a user identifier from a user interface of an electronic device, wherein the user identifier identifies a user from among a set of users

402 — Receiving an item identifier associated with the user identifier, wherein the item identifier identifies an item in a catalog comprising a set of items

403 — Determining user item quantity information related to quantities of the item previously selected by the user in first prior user transactions by the user involving the item in a predetermined time period

404 — Determining a respective household size for each user in the set of users

405 — Determining aggregate household item quantity information related to quantities of the item previously selected by each user in a portion of the set of users, in first prior item transactions by the portion of the set of users involving the item in the predetermined time period, wherein each user in the portion of the set of users has a household size corresponding to the respective household size of the user

406 — Determining whether a quantity of the first prior user transactions by the user meets or exceeds a first threshold level

407 — When the quantity of the first prior user transactions is determined to meet or exceed the first threshold level, determining a recommended quantity of the item for notification to the user based on the user item quantity information

408 — When the quantity of the first prior user transactions is determined to be greater than zero but does not meet or exceed the first threshold level, determining the recommended quantity of the item for notification to the user based on the aggregate household item quantity information

409 — Updating the user interface of the electronic device to notify the user of the recommended quantity of the item

501 — Determining an item confidence interval for the aggregate household item quantity information for the item for the household size corresponding to the respective household size of the user

502 — Determining whether a most frequently selected quantity of the item selected by the user is within the item confidence interval for the item

503 — When the most frequently selected quantity is determined to be within the item confidence interval for the item, selecting, as the recommended quantity, the most frequently selected quantity of the item selected by the user

410 – Receiving product-type information that identifies one or more products of a type related to the item

411 – When the quantity of first prior user transactions is determined to be zero, determining user product type quantity information related to quantities of the one or more products of the type related to the item previously selected by the user in second prior user transactions by the user involving the one or more products of the type related to the item

412 – Determining aggregate household product type quantity information related to quantities of the one or more products of the type related to the item previously selected by each user in the portion of the set of users in second prior item transactions by the portion of the set of users involving the one or more products of the type related to the item

413 – Determining whether a quantity of the second prior user transactions meets or exceeds a second threshold level

414 – When the quantity of the second prior user transactions is determined to meet or exceed the second threshold level, determining the recommended quantity of the item for notification to the user based on the user product type quantity information

415 – When the quantity of the second prior user transactions is determined to be greater than zero but not meet or exceed the second threshold level, determining the recommended quantity of the item for notification to the user based on the aggregate household product type quantity information

| 419 — Determining whether the quantity of the first prior item transactions meets or exceeds a third threshold level |

| 420 — When the quantity of the first prior item transactions is determined to meet or exceed the third threshold level, selecting, as the recommended quantity, either a most frequently selected quantity of the item selected by each user in the portion of the set of users in the first prior item transactions, or a median selected quantity of the item selected by each user in the portion of the set of users in the first prior item transactions |

421 — When the quantity of the first prior item transactions by the portion of the set of users is determined to be greater than zero but does not meet or exceed the third threshold level, determining whether the quantity of the second prior item transactions meets or exceeds a fourth threshold level

422 — When the quantity of the second prior item transactions is determined to meet or exceed the fourth threshold level, selecting, as the recommended quantity, either a most frequently selected quantity of the one or more products of the type related to the item selected by each user in the portion of the set of users in the second prior item transactions, or a median selected quantity of the one or more products of the type related to the item selected by selected by each user in the portion of the set of users in the second prior item transactions

FIG. 9 ness, according to certain embodiments;

SYSTEMS AND METHODS FOR PREDICTION OF ITEM QUANTITY

TECHNICAL FIELD

This disclosure relates generally to systems and methods for predicting the quantity of an item to recommend for selection by user, and notifying the user of the recommended quantity.

BACKGROUND

The identification of suitable quantities of items for purchase can be desirable in retail settings, for example to allow a person to efficiently order items in a quantity that is appropriate for their needs, and to reduce the amount of time needed for purchase transactions. However, it can be difficult for a person engaged in an online or other electronic purchase transaction to readily identify an appropriate quantity for an item of interest, because the person cannot directly visually examine the item to assess the appropriate quantity and/or amount. Added complexity can arise when an item is available in multiple different quantities and/or amounts. While a drop down menu available on an online ecommerce site for a retailer can be used to advise the person as to what specific quantities in which the item is available, the person may still be uncertain as to which of the available quantities would be appropriate. This result may lead the person to overestimate or underestimate the amount needed, and/or to expend a significant amount of time and effort trying to ascertain a correct quantity for the order.

This situation can be exacerbated when the person is ordering from an online retailer via a voice-interface, such as an electronic home assistant or voice-activated mobile assistant, as the available quantities of the item often cannot be readily visually displayed for selection by the person. In order to order an appropriate quantity of the item via such a voice-interface, the person typically must either be certain of the proper quantity for the item in advance of the order, or otherwise endure a potentially lengthy audio recitation of all available quantities of the item, and then remember the audio recitation in sufficient detail to be able to select an appropriate quantity therefrom.

BRIEF DESCRIPTION OF THE DRAWINGS

To facilitate further description of the embodiments, the following drawings are provided in which:

FIG. 4 illustrates a flowchart for a method, according to certain embodiments;

FIG. 5 illustrates a flowchart for an activity in the method depicted in FIG. 4, according to certain embodiments;

FIG. 6 illustrates a flowchart for further activities in the method of FIG. 4, according to certain embodiments;

FIG. 8 illustrates a flowchart for further activities in the method of FIG. 4, according to certain embodiments;

FIG. 9 illustrates a flowchart for further activities in the method of FIG. 4, according to certain embodiments;

Figure 1:
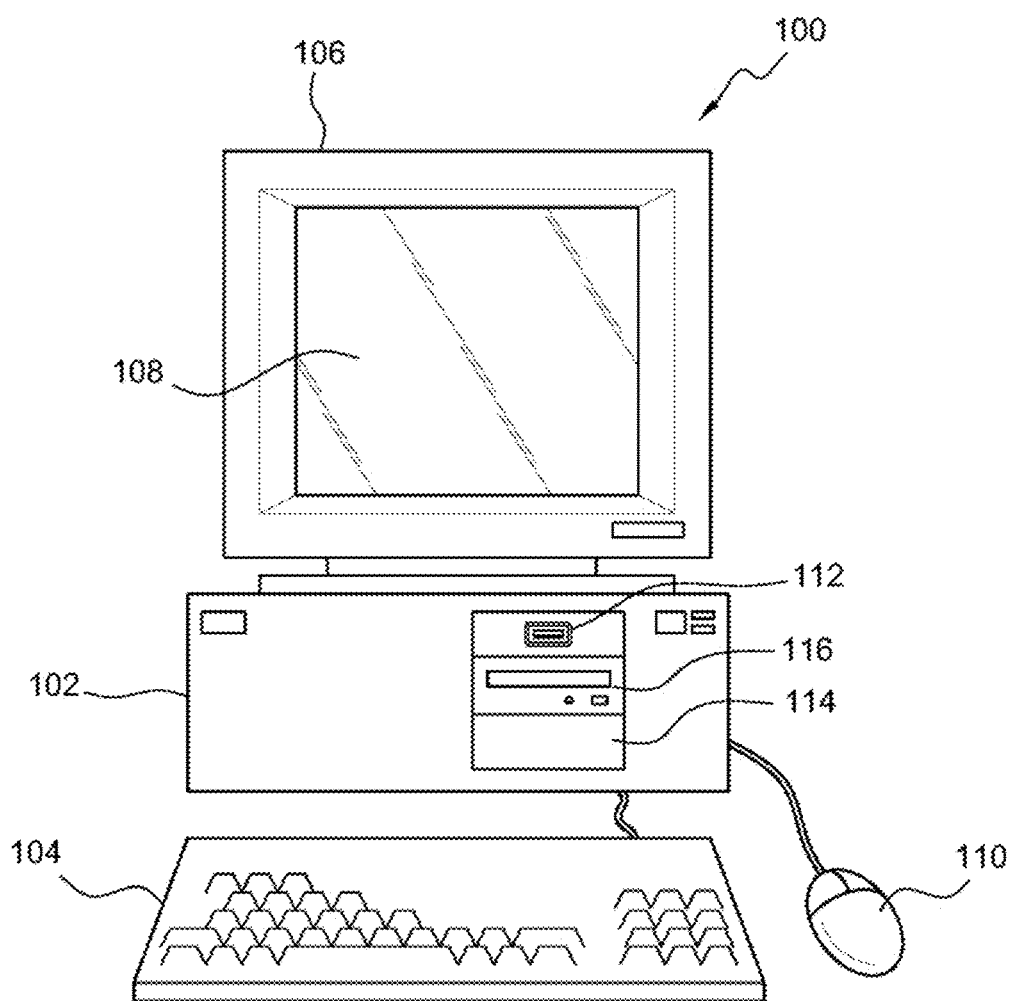
FIG. 1 illustrates a front elevational view of a computer system that is suitable for implementing various embodiments of the systems disclosed in FIGS. 3 and 10.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of receiving a user identifier from a user interface of an electronic device, wherein the user identifier identifies a user from among a set of users, receiving an item identifier associated with the user identifier, wherein the item identifier identifies an item in a catalog comprising a set of items, determining user item quantity information related to quantities of the item previously selected by the user in first prior user transactions by the user involving the item in a predetermined time period, determining a respective household size for each user in the set of users, determining aggregate household item quantity information related to quantities of the item previously selected by each user in a portion of the set of users, in first prior item transactions by the portion of the set of users involving the item in the predetermined time period, wherein each user in the portion of the set of users has a household size corresponding to the respective household size of the user, determining whether a quantity of the first prior user transactions meets or exceeds a first threshold level, and when the quantity of the first prior user transactions is determined to meet or exceed the first threshold level, determining a recommended quantity of the item for notification to the user based on the user item quantity information, and when the quantity of the first prior user transactions is determined to be greater than zero but does not meet or exceed the first threshold level, determining the recommended quantity of the item for notification to the user based on the aggregate household item quantity information, and updating the user interface of the electronic device to notify the user of the recommended quantity of the item.

Various embodiments include a method. The method can be implemented via execution of computing instructions configured to run at one or more processors and configured to be stored at non-transitory computer-readable media The method can comprise receiving an item identifier associated with the user identifier, wherein the item identifier identifies an item in a catalog comprising a set of items, determining user item quantity information related to quantities of the item previously selected by the user in first prior user transactions by the user involving the item in a predetermined time period, determining a respective household size for each user in the set of users, determining aggregate household item quantity information related to quantities of the item previously selected by each user in a portion of the set of users, in first prior item transactions by the portion of the set of users involving the item in the predetermined time period, wherein each user in the portion of the set of users has a household size corresponding to the respective household size of the user, determining whether a quantity of the first prior user transactions meets or exceeds a first threshold level, and when the quantity of the first prior user transactions is determined to meet or exceed the first threshold level, determining a recommended quantity of the item for notification to the user based on the user item quantity information, and when the quantity of the first prior user transactions is determined to be greater than zero but does not meet or exceed the first threshold level, determining the recommended quantity of the item for notification to the user based on the aggregate household item quantity information, and updating the user interface of the electronic device to notify the user of the recommended quantity of the item.

In various environments, including ecommerce and retail environments, users typically have many interactions and behaviors that can be used to better understand their preferences. For example, users may have a transaction history that indicates a preference for certain items, and/or may have other interactions that indicate their preferences. According to certain embodiments, the effective understanding of users and their preferences, to personalize their experiences with the ecommerce and/or retail environment, could go a long way to increasing the revenue generated from users and user satisfaction. According to one embodiment, methods and systems are provided herein to predict not just the items preferred by the user, but to predict a suitable quantity of the item for purchase by the user. For example, a quantity of the item that is suitable for the particular user's needs can be identified and recommended to the user, to reduce the effort the user is required to make in purchasing the item, and to increase satisfaction with the item purchase.

In one embodiment, a system and method as described in further detail herein are capable of receiving as input a customer identification number (CID) and a list of items the customer has indicated are of interests for purchase. The system and method, according to certain embodiments, are capable of using this information to generate as output to the user a predicted quantity all of the items in the list. The predicted quantity, according to certain embodiments, corresponds to the quantity that is expected to be satisfactory to the user, and/or to meet the user's retail needs. According to certain aspects, the predicted quantity corresponds to any of a weight of the item, a certain number of units of the item, and/or a combination thereof.

In certain embodiments, the system and method described herein are capable of predicting the quantity of an item for a user, given the identification of the user and the identification of the item for which it is desired to predict the quantity. According to one embodiment, the system and method are capable of obtaining the user's engagement and transactional history. According to certain embodiments, the system and method are capable of incorporating the user's household information to build a model that predicts the quantity of the item for the user. According to yet further embodiments, the system and method are capable of building an item prediction model at a global level (e.g., using transactional and/or purchasing information from another larger set of users) as a fallback, for example if the user's own transactions are not adequate to predict the quantity of the item for the user. According to embodiments, the model that predicts the quantity incorporating the user's household information, and the item prediction model from the set of users can be used, either alone or in combination with one another, to predict the quantity of the item recommended for the user.

According to one embodiment, the recommended quantity of the item can be personalized to the user (e.g., specific to the user's requirements) by incorporating information from various personalization signals and/or information. For example, the information that can be incorporated to provide a personalized quantity recommendation can include user transactional patterns for the past year, including at the item level (e.g., a specific brand of dairy milk), product level (dairy milks generally) and product-type level (products similar to dairy milk, such as soy milk and/or almond milk). As another example, the information that can be incorporated to provide a personalized quantity recommendation can include household information for the users, such as household size. As yet another example the information that can be incorporated to provide a personalized quantity recommendation can include global item transactional patterns (e.g., transactional patterns for a larger set of users) for the past year, including at the item level, product level, and product-type level. As yet another example, the information that can be incorporated to provide a personalized quantity recommendation can include outlier and/or anomaly handling information, to improve the accuracy and/or reliability of the quantity prediction.

Figure 11:
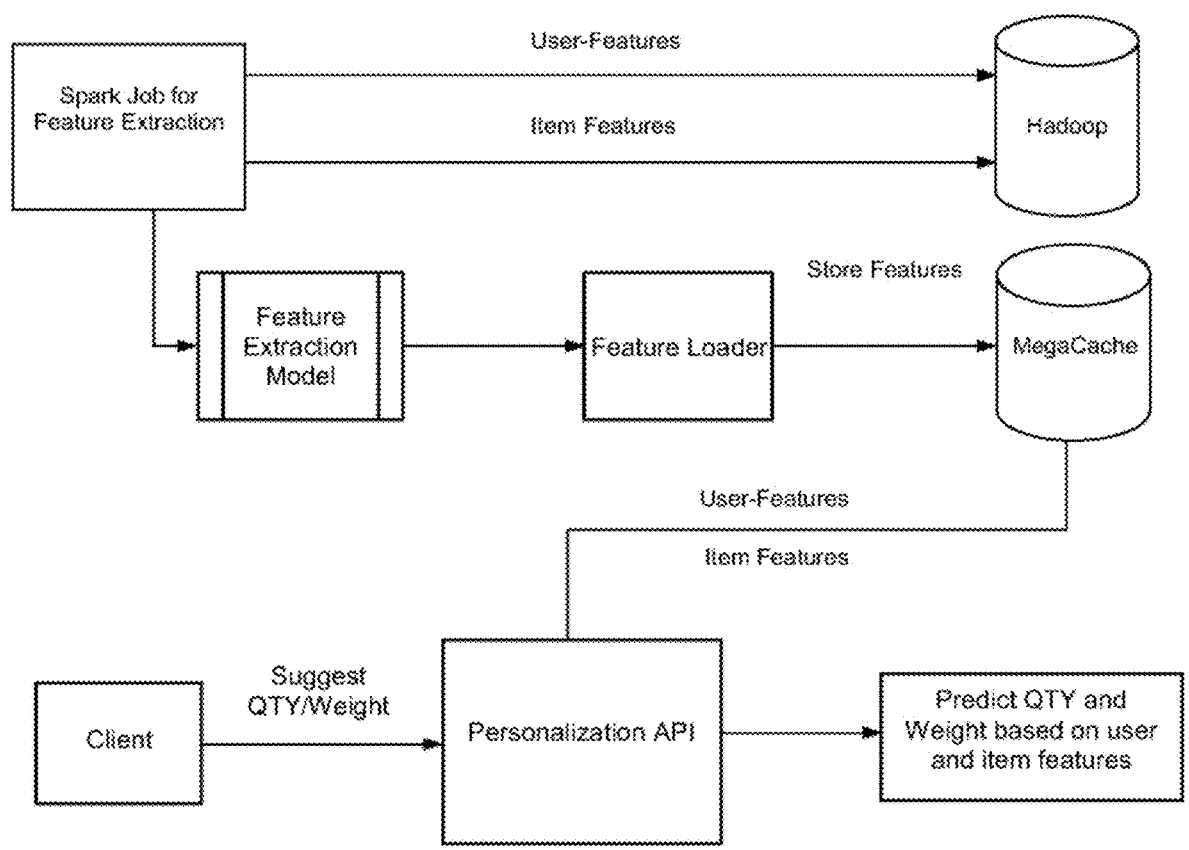
FIG. 11 illustrates a schematic of an architecture for a system, according to certain embodiments.

Referring to FIG. 11, an embodiment of a system architecture is illustrated that may be suitable for implementing aspects of the method and/or system described herein. As shown in FIG. 11, a Spark job module for feature extraction is in communication with a Hadoop system, with user features and item features being communicated for storage and/or processing thereof. The Spark job module is also in communication with a feature extraction model module that extracts features, and which communicates with a feature loader, to store features on a megacache. A client is in communication with a personalization API (application programming interface) regarding suggestion of quantity (e.g., number of units and/or weight) of an item, and the personalization API provides user features and item features to the megacache. The personalization API predicts the quantity of the item based on user and item features.

According to one embodiment, the prediction of the quantity for suggestion to the user may be formulated according to certain item category rules. In one embodiment, an item category rule comprises, for items sold individually, a predicted quantity corresponding to a last purchased quantity for that item by that user. For example, for certain items sold individually, a last purchased quantity can be a good predictor of a quantity that would be acceptable to the user. In another embodiment, an item category rule comprises, for items sold individually by weight (e.g. produce such as apples or watermelons), when the individual weight of the item is greater than or equal to a predetermined amount (e.g., greater than or equal to 0.5 lbs), then a predicted quantity that is suggested to the user is the last purchased quantity for that item by the user, as with the items sold individually above. However, according to certain embodiments, when items are sold individually by weight but the individual weight of the item is less than the predetermined amount (e.g., less than 0.5 lbs), then one or more models are used to predict the quantity, such as the models described elsewhere herein incorporating household information and/or models incorporating prior transaction information by the user and/or a global set of users for the item and/or products similar to the item. As an example of another item category rule, for items sold entirely by weight (e.g. bulk items such as granola, grains, etc.) the predicted quantity that is suggested to the user can similarly be based on such models.

According to one embodiment, a Bayesian formulation is used to provide a model for prediction of the item quantity, as shown below. That is, in modeling P(u, q, h):

$$P(u, q, h) = P(u, h) * P(q|u, h(u)) = \underbrace{P(h)}_{\text{Household Size}} * \underbrace{P(u|h(u))}_{\text{User for household}} * \underbrace{P(q|u, h(u))}_{\text{User Preferred Quantity}}$$

u represents the user in consideration;
q represents the quantity of the item;
h represents the household size; and
P(h) represents the prior probability distribution of household size, as determined using pre-existing information, and before taking into account information obtained using models for household size. A probability distribution of household size that takes into account information obtained using household size models can be referred to as posterior probability distribution.

According to one embodiment, the prior P(h) can be estimated from the offline historical transactional data, for example assuming that the user preferences remain similar.

$$P(h = h1) = \frac{\text{\# of household sizes } h1}{\text{\# of household sizes}}$$

According to one embodiment, P(u|h(u)) represents the probability of choosing that particular user given the household size (assuming uniform distribution). Accordingly, the following can be computed and updated from historical web data:

$$P(u = u1 | h = h(u1)) = \frac{1}{\text{\# of users in household size } h(u1)}$$

According to one embodiment, P(q|u, h(u)) represents the probability of choosing a particular quantity for a given item, user and his household size. Accordingly, P(q|u, h(u)) can be obtained from historical data.

According to one embodiment, if there is less confidence about this prediction, then the distribution can be approximated at a global level, per the below.

$$P(q|u,h(u)) \approx P(q|h(u))$$

Furthermore, according to certain embodiments, the confidence with respect to a prediction can be obtained using outlier handlers and tolerance intervals. Furthermore, the prior values can be updated after every interaction.

Figure 12:
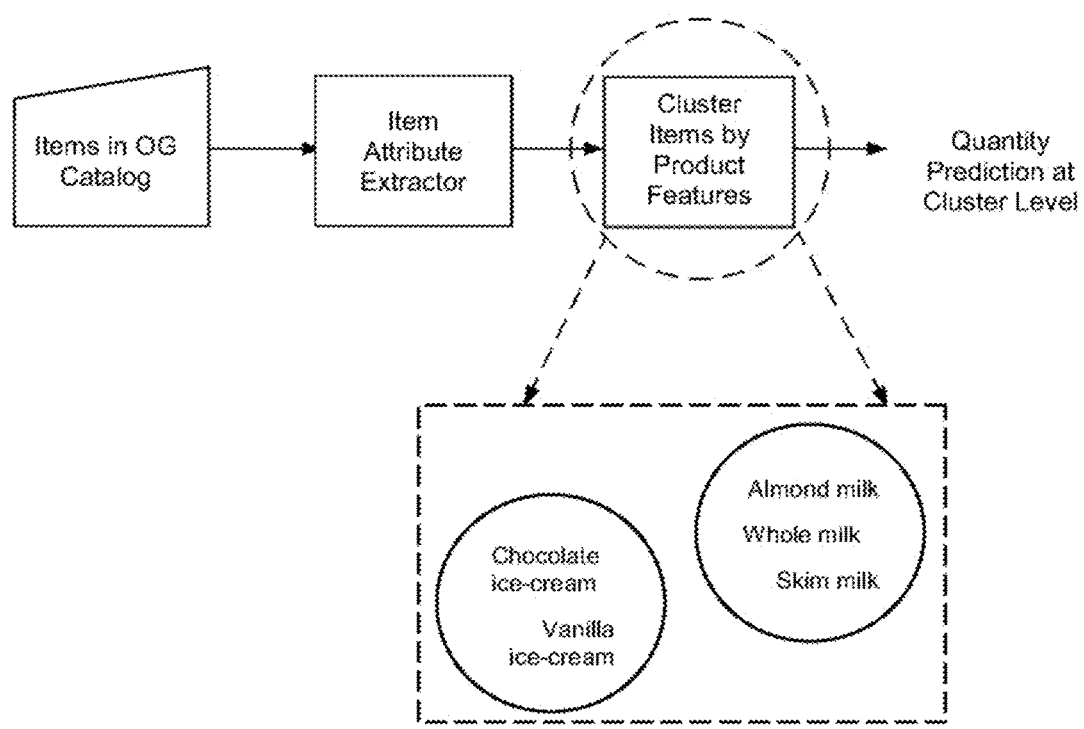
FIG. 12 illustrates a schematic of a pipeline for predicting quantity information by clustering items, according to certain embodiments.

According to one embodiment, clustering can be performed to predict quantities according to transactional information that is available for the item as well as products similar to and/or sharing characteristics with the item. For example quantities can be predicted for the item at the item, product and product-type levels, where transactional information at the product and/or product-type levels can be used as a fallback when transactional information at the item level does not exist, or is insufficient. For example, according to one embodiment, a user may have a quantity preference for a particular type of item, such as for milk. When predicting a quantity of a specific milk (specific brand or other specific type of milk), even if a user has not bought the specific milk before, the previous transactional history of the user of all milks can be used to provide a prediction of quantity for the specific milk. Furthermore, the previous transactional history of the user for items similar to the milk can also be joined in a cluster of similar items for that user, for example as depicted in the schematic illustrated in FIG. 12. In FIG. 12, the items in a catalog are subject to an item attribute extractor, which is used to cluster items by product features, and predict a quantity of an item at a cluster level. For example, products including almond milk, whole milk and skim milk can be clustered together as a first cluster, whereas chocolate ice cream and vanilla ice cream can be clustered together as a second cluster. Transactional information for the items in the cluster that is related to the item can be used to formulate the prediction of quantity of the item for recommendation to the user.

Figure 13:
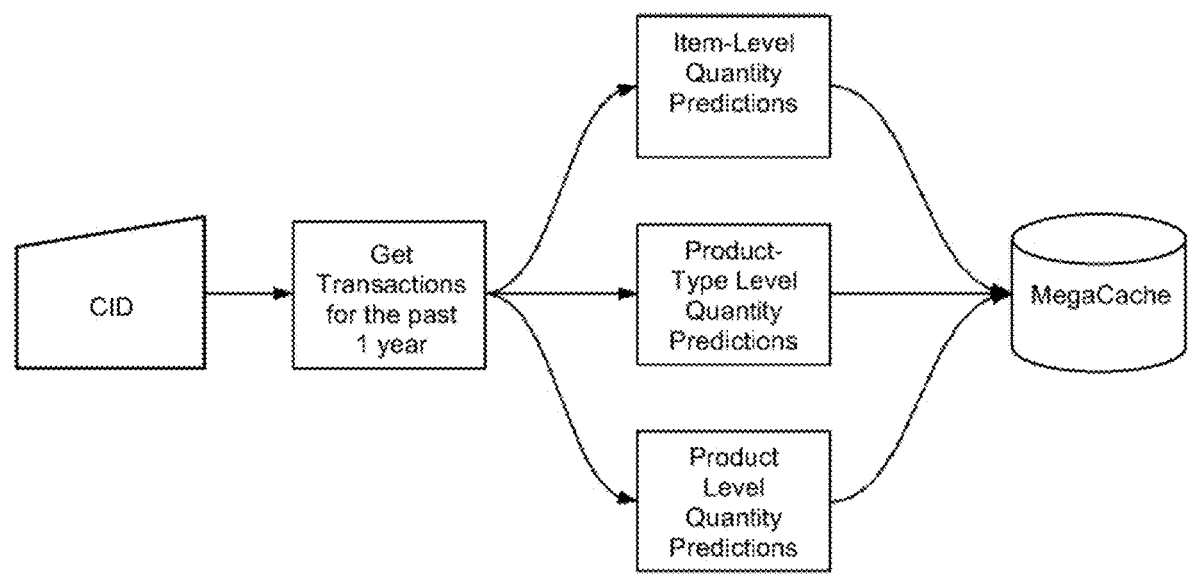
FIG. 13 illustrates a schematic of a pipeline for predicting quantity information from user transactions, according to certain embodiments.

According to certain embodiments, user quantity pipelines can be implemented to compute and store information regarding quantities of items in transactions, for example as shown in FIG. 13. For example, the user quantity predictions can consider one year of transactions, and can consider transactions at the item level, product-type level and product level. The types of quantities computed and stored at all levels using the pipeline can include a most frequently purchased quantity of the item (i.e., the mode), a median purchased quantity of the item, and a last purchased quantity of the item.

Figure 14:
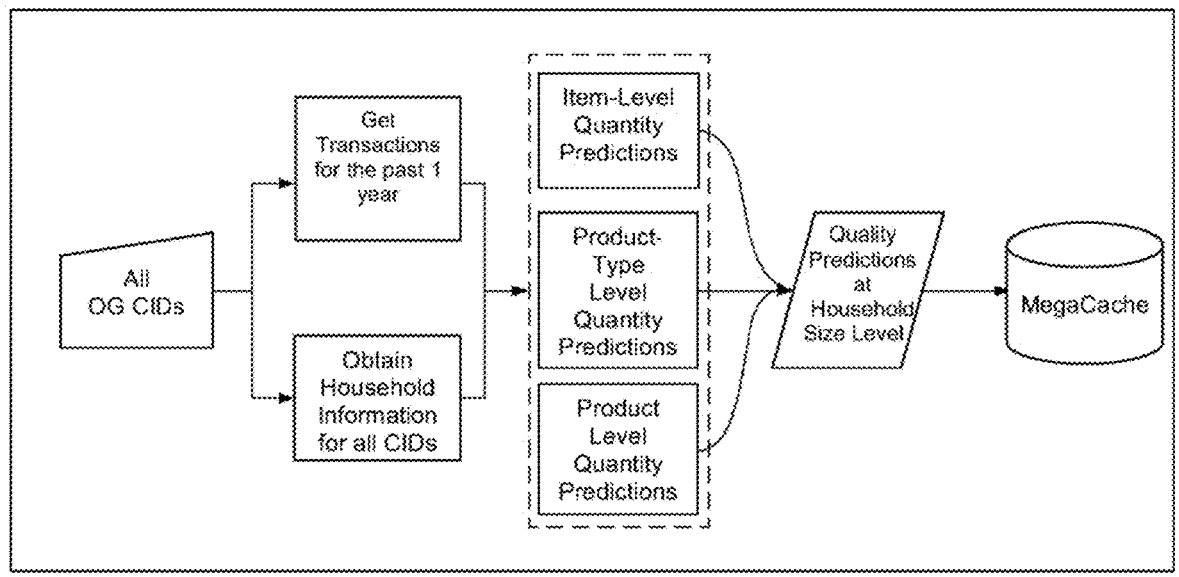
FIG. 14 illustrates a schematic of a pipeline for predicting quantity information from global transactions, according to certain embodiments.
Figure 15:
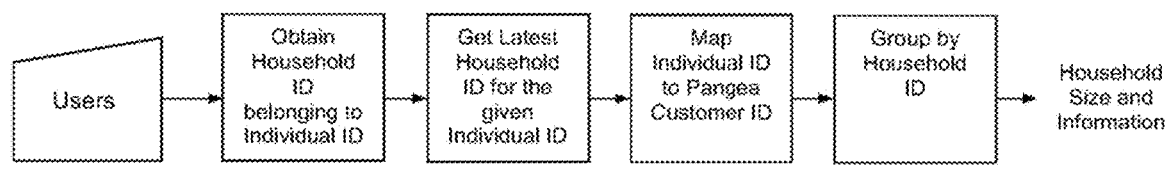
FIG. 15 illustrates a schematic of a pipeline for predicting household information, according to certain embodiments.

According to many embodiments, global quantity pipelines, for example as shown in FIG. 14, and household size pipelines, for example as shown in FIG. 15, can be implemented. According to one embodiment, the household size and information is determined for all users by obtaining a household ID belonging to an individual ID, getting the latest household ID for the given individual ID, mapping the individual ID to a customer ID, and grouping by household ID, as shown for example in FIG. 15. This household information is then used to determine global quantities per the pipeline shown in FIG. 14. As with the user transactions, the global quantity predictions can consider one year of transactions, and can consider transactions at the item level, product-type level and product level. All the global quantities are computed for each household size, and the global quantities are stored.

According to many embodiments, anomalies in the transactional information can be identified and handled. For example, before recommending a quantity for an item, the quantities of items purchased by users are evaluated to determine whether they values for those quantities are outliers and/or anomalies. According to one embodiment, a tolerance interval is calculated that specifies that x % of the population lies in the interval with probability p. Furthermore, according to certain embodiments, if there are not enough purchases of an item or product related to the item by the user to be confident in the predicted quantity based on these prior transactions, then the prediction can defer to the prediction based on global transactions for the item or product related to the item. According to one embodiment, an interval of confidence is obtained for quantities obtained through global transactions to get an estimate of a suitable range for a user quantity purchase. According to certain embodiments, the interval of confidence can be centered either around the mode or the median of the purchased quantity, depending on the frequency of the mode.

According to one embodiment, a confidence interval p for a population of selected quantities with probability γ is as in Formula (1) as follows:

$$\tilde{x} \pm k_2 \sigma \qquad \text{Formula (1)(p)}$$

$$k_2 = z_{(1-p)/2} \sqrt{\frac{(n-1)\left(1+\frac{1}{n}\right)}{\chi^2_{\gamma,n-1}}\left(1 + \frac{(n-3)-\chi^2_{\gamma,n-1}}{2(n+1)^2}\right)}$$

where $\tilde{x}$ is the population parameter;
if the frequency of the mode >1, then $\tilde{x}$=mode;
else $\tilde{x}$=Median;
σ is the standard deviation of the sample;
z is the critical value of the normal distribution associated with cumulative probability (1−p)/2. For example, it can be obtained from the cumulative distribution function of the standard normal distribution and can be built as a look-up table for the usual confidences (90%, 95%, 99%, etc.);
n is the number of samples; and
$\chi^2_{\gamma,\ n-1}$ is the $\chi^2$ with n−1 degrees of freedom that is exceeded with probability γ. $\chi^2$ refers to the critical value of the chi-square distribution with n−1 degrees of freedom that is exceeded with probability gamma. In certain cases, this can be similar to obtaining the critical value for the standard normal distribution from its cumulative distribution function, as discussed above.

Furthermore, according to one embodiment, if the frequency of purchase by the user with respect to an item is 1 (the user has bought the item only once), then the purchased quantity can be compared to the confidence interval to verify it lies within the confidence interval for the item. According to certain embodiments, if this purchased quantity does not lie within the confidence interval, then a quantity is predicted based on the global purchase information for that item. According to yet another embodiment, if the item has been purchased more than once by the user, but the frequency of the mode is 1 or there are multiple modes, then outliers outside 2σ (two standard deviations) of the mean are thrown out before recommending a median of the remaining purchased quantities. As an example of outlier/anomaly handling, a user purchase history can be considered where the user has previously purchased apples in the following quantities: 3 count (transaction 1); 4 count (transaction 2); 3 count (transaction 3), 4 count (transaction 4); and 50 count (transaction 4). The 50 count transaction is thrown out as being outside two standard deviations of the mean. Furthermore, because the frequencies of the modes are equal (two 3 count transactions, and two four count transactions), the median is used as the predicted quantity, and rounded to the next quantity, which in this case resulted in 3 (rounded down from the actual median of 3.5).

Figure 16A:
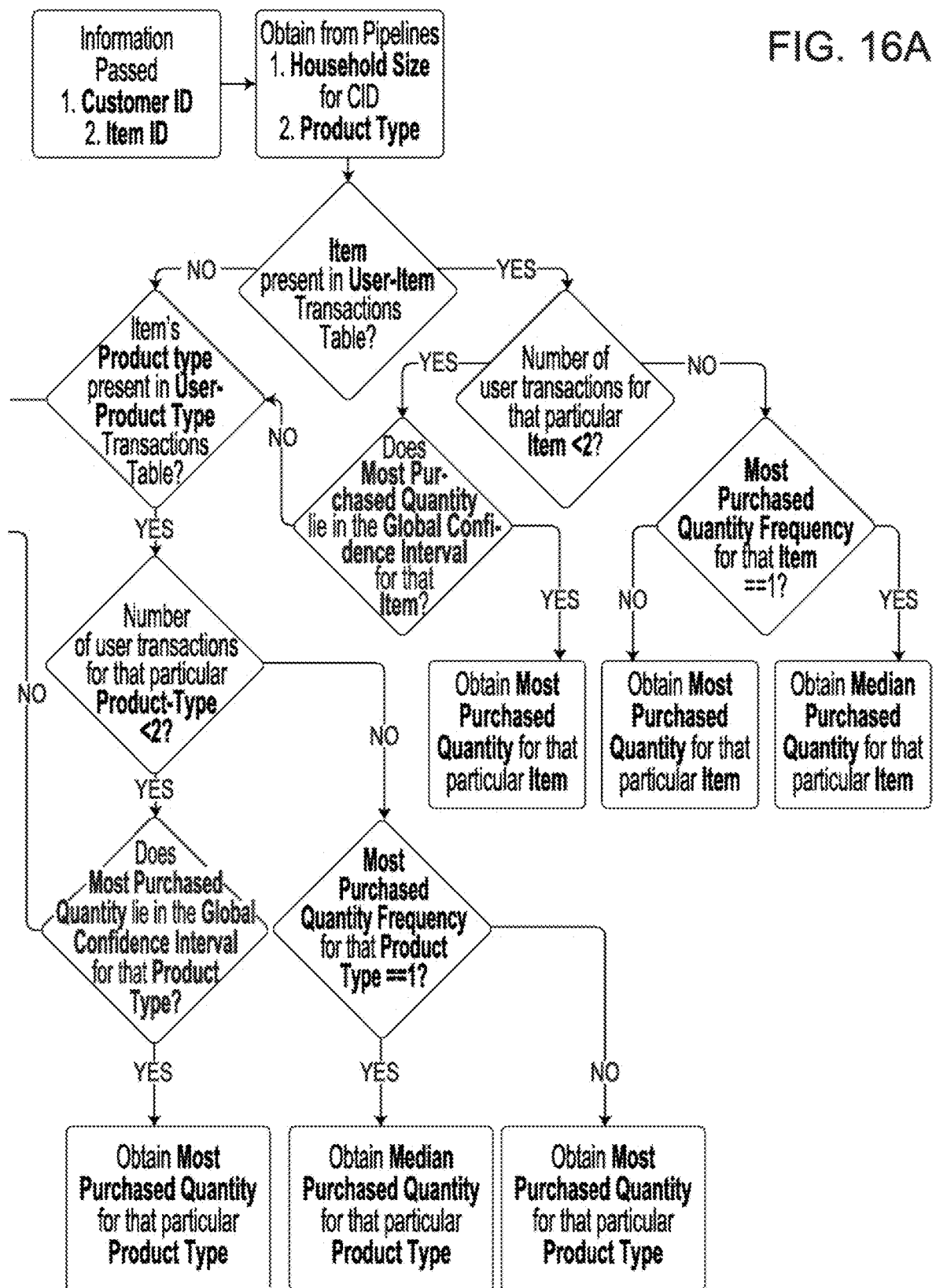
FIGS. 16A-16B illustrates a flowchart for a method, according to certain embodiments.
Figure 16B:
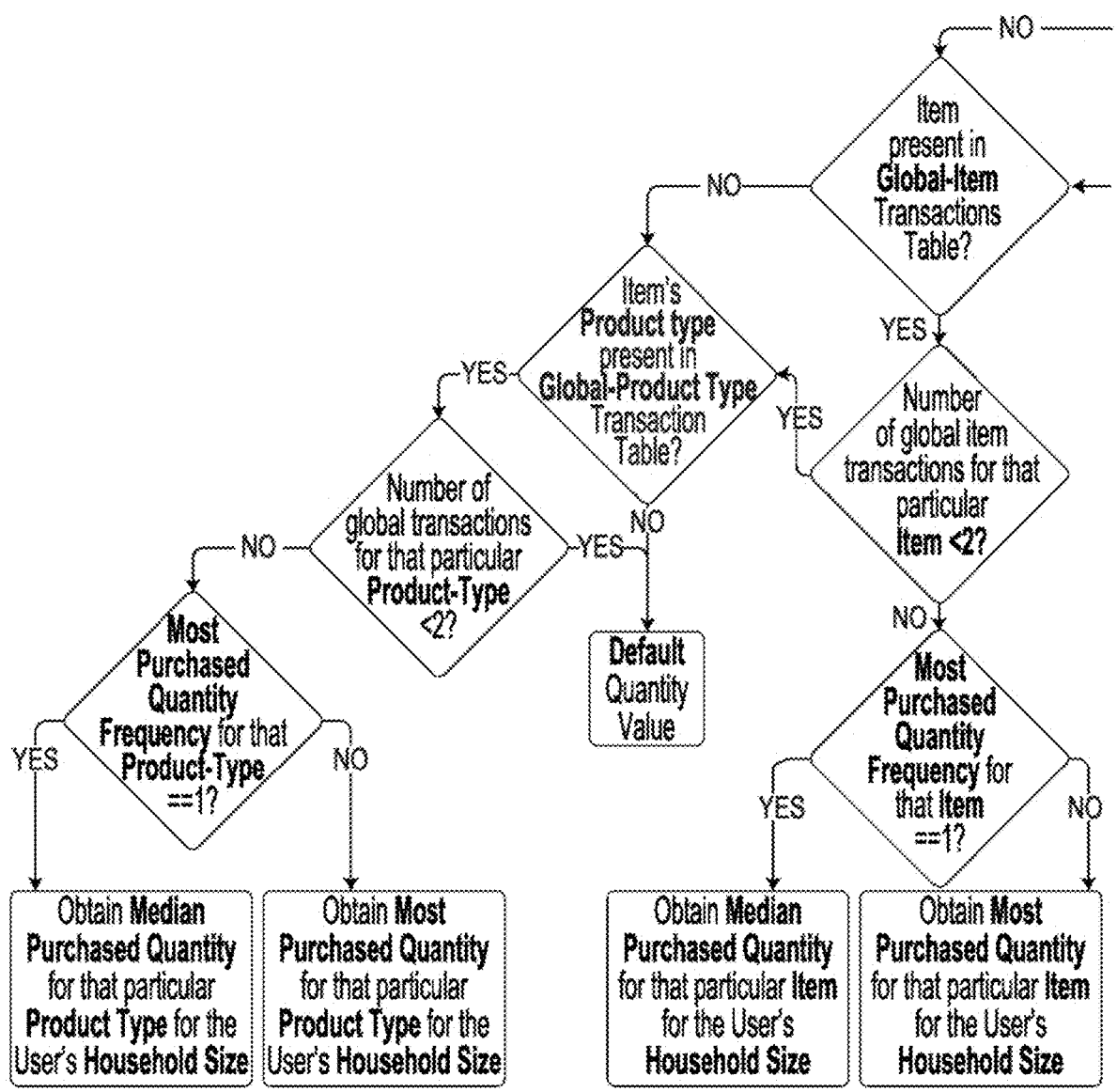

FIGS. 16A-16B depict a flowchart illustrating decision points and/or processing in an embodiment of a method for predicting item quantity information. In the flowchart, the customer ID and item ID are received, and household size for the customer ID is obtained from the household information pipeline, and information relating to quantities purchased by the user and households having the same size as the user, for the item and products of a same type of as the item are obtained from the quantity pipelines. If the user has purchased the item before, then this user purchase information can be used to determine a predicted quantity, for example by seeing whether the number of purchases of the items meets a threshold level, and if so selecting either a most purchased quantity or a median purchased quantity based on the frequency of the most purchased quantity. If the user has purchased the item before, but the number of purchases does not meet a threshold, then the most purchased quantity for the prior purchase(s) is compared to a global confidence interval for the item, and if it is within the global confidence interval, then the most purchased quantity is selected as the predicted quantity.

As shown in FIGS. 16A-16B, in one embodiment, when the most purchased quantity is outside the global confidence interval for the item, or the user does not have any prior transactions with the item (the user's transaction history with respect to the specific item is not a good predictor of quantity), then the user's prior transactions with the product type is evaluated. If the user has purchased a product of the same type as the item before, then this user purchase information can be used to determine a predicted quantity, for example by seeing whether the number of purchases of the products meets a threshold level, and if so selecting either a most purchased quantity or a median purchased quantity based on the frequency of the most purchased quantity. If the user has purchased the product of the same type as the item before, but the number of purchases does not meet a threshold, then the most purchased quantity for the prior purchase(s) is compared to a global confidence interval for the product type, and if it is within the global confidence interval, then the most purchased quantity is selected as the predicted quantity.

As is also shown in FIGS. 16A-16B, in one embodiment, when the most purchased quantity is outside the global confidence interval for the product type, or the user does not have any prior transactions with the product type (the user's transaction history with respect to the product type is not a good predictor of quantity), then the global transactions with respect to the item are evaluated to provide a quantity prediction. For example, when the item is present in the global user transactions and number of purchases of the item by the global users exceeds a threshold value, then either a most purchased quantity or a median purchased quantity can be selected as the predicted quantity of the item, based on the frequency of the most purchased quantity. If the item is present in the global user transactions, but the number of purchases does not meet a threshold, then the global transactions with respect to the products of the same type as the item are evaluated to provide a quantity prediction. For example, when the product type is present in the global user transactions and number of purchases of the product by the global users exceeds a threshold value, then either a most purchased quantity or a median purchased quantity can be selected as the predicted quantity of the item, based on the frequency of the most purchased quantity. If the product type is not present in the global user transactions, or is present but the number of purchases of the product does not exceed the threshold value, then a default quantity value can be provided as the predicted quantity.

Figure 17:
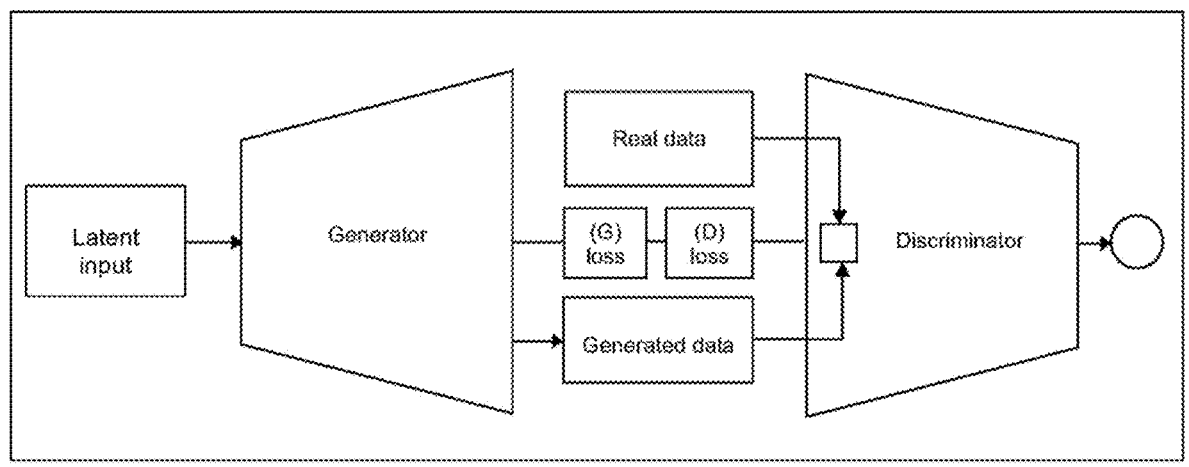
FIG. 17 illustrates a schematic of an architecture for a system, according to an additional embodiment.

FIG. 17 is a schematic depicting another embodiment of an architecture suitable for certain methods and systems described herein. The architecture can use GANs (Generative Adversarial Networks) to predict quantities of items. According to one embodiment, the architecture consists of two models, a generator (G) and a discriminator (D). The generator seeks to generate data indistinguishable to the real data, where the purpose is to learn the distribution of the real data. The real or generated data is fitted into the Discriminator, which acts as a classifier and tries to understand whether the data is coming from the generator or is the real data. The discriminator estimates the probabilities (distributions) of the incoming sample to the real dataset. According to one embodiment, a long short term memory (LSTM) recurrent neural network can be used as the generator, and a convolutional neural network (CNN) can be used as the discriminator.

According to one embodiment, the losses from the generator and discriminator are combined and propagated back through the generator, with the process continuing until the discriminator can no longer distinguish generated from real data. A loss function can be of the following formula:

$$L(D,G) = \mathbb{E}_{x \sim p_r(x)}[\log D(x)] + \mathbb{E}_{z \sim p_z(z)}[\log(1 - D(G(z)))]$$

where $\mathbb{E}_{x \sim pr(x)}$ is the expected value of the probability distribution over all real data instances;

$E_{z \sim pz(z)}$ is the expected value of the probability distribution over all random inputs to the generator (e.g., in effect, the expected value over all generated artificial instances G(z));

x refers to real instances from probability distribution P(x);

D(x) is the estimate by the discriminator of the probability that the real data instance x is in fact real;

z refers to inputs to the generator from the probability distribution P(z); and

G(z) is the output from the generator when given input z.

Accordingly, embodiments of the methods and/or systems described herein can be capable of providing personalized quantity prediction, for example to supplement item recommendations. Embodiments can also be capable of incorporating household information to provide the personalized prediction, for example as a household of size 4 will have different quantity requirements than a household of size 1. Embodiments can also incorporate prior transaction information specific to the user if it is available, and otherwise fallback to global transactions to determine a predicted quantity. Furthermore, embodiments herein are capable of handling outliers smartly to improve the accuracy and reliability of the quantity prediction.

Figure 2:
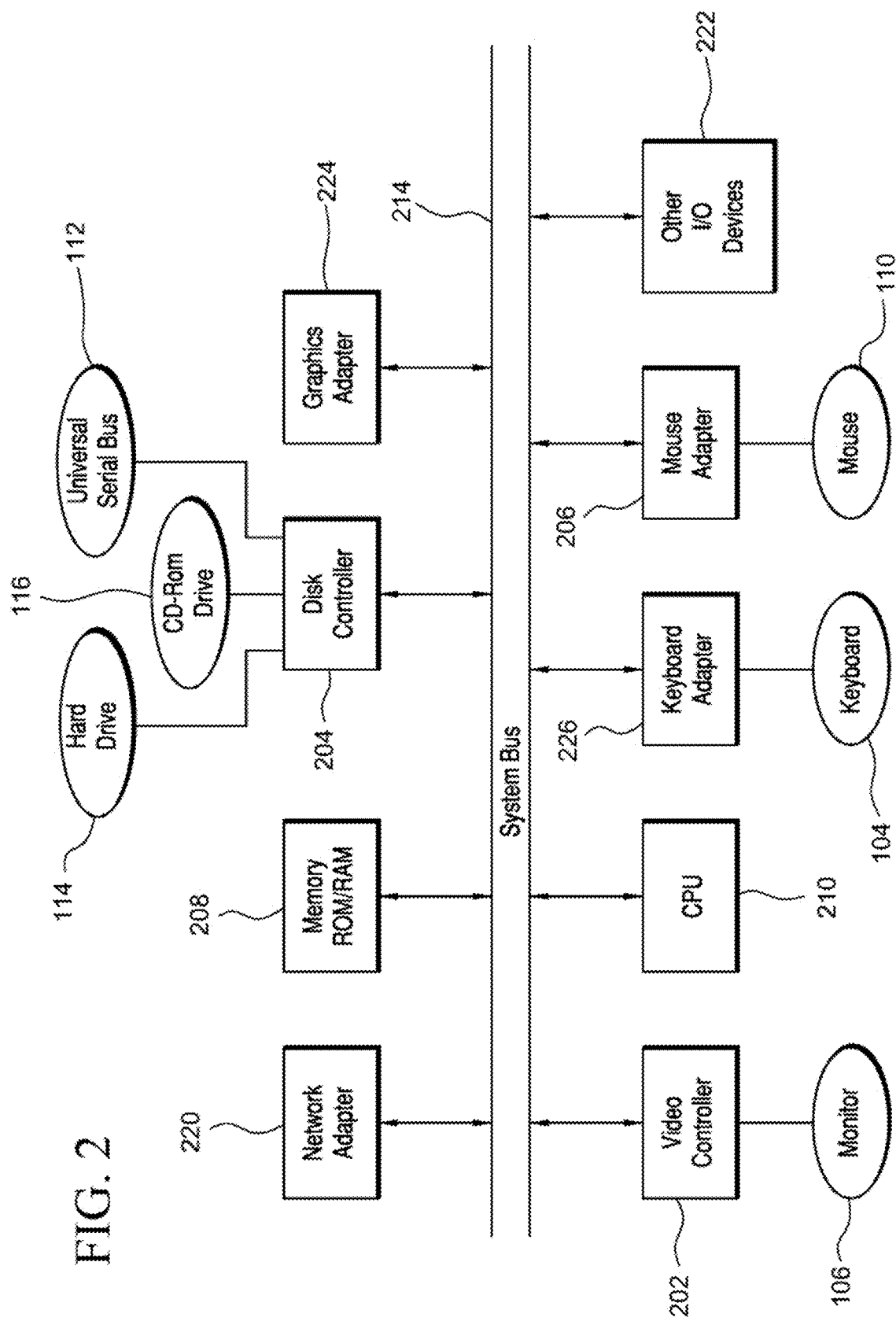
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
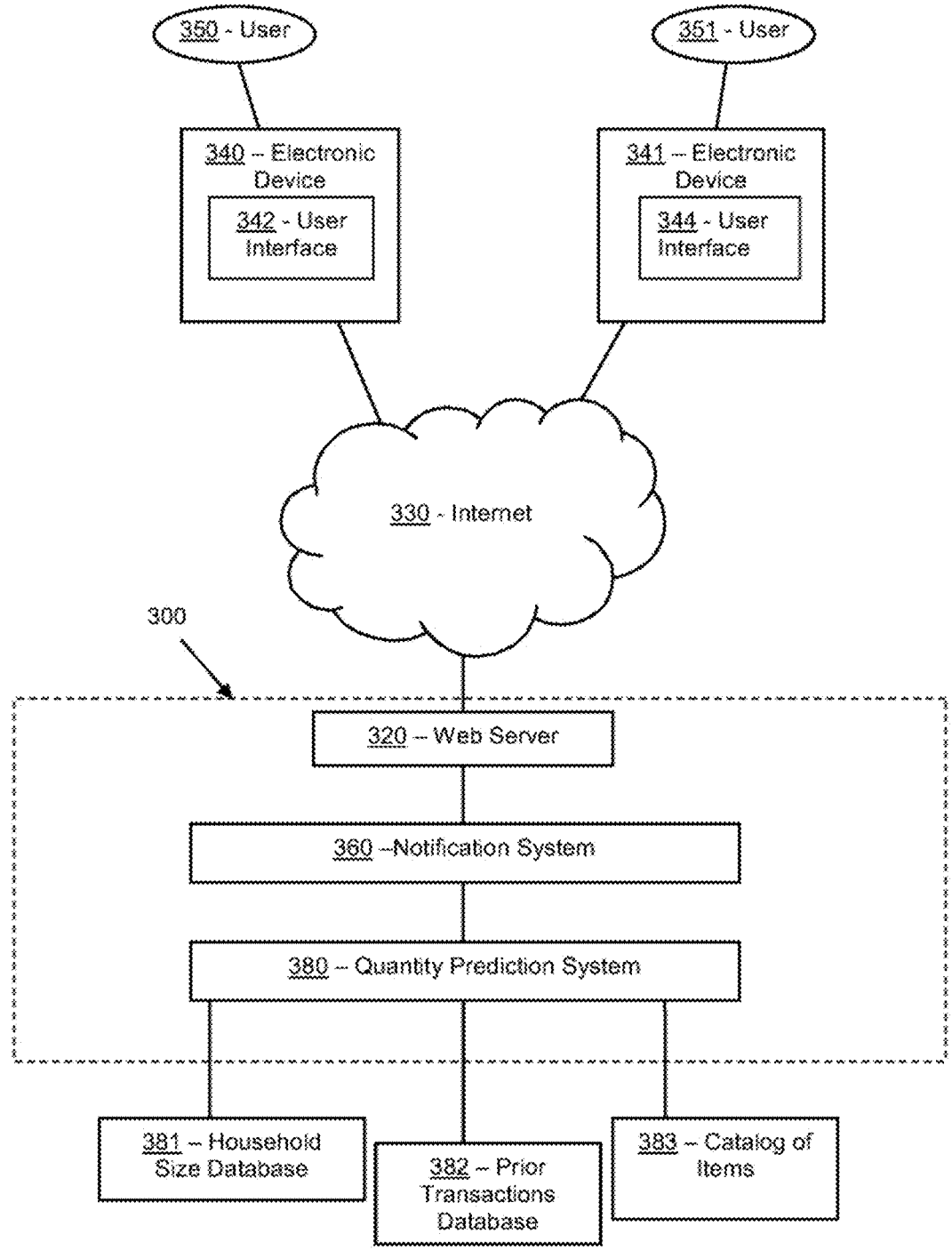
FIG. 3 illustrates a representative block diagram of a system, according to an embodiment.

Turning ahead in the drawings, FIG. 3 illustrates a block diagram of a system 300 that can be employed for systems and method for prediction of item quantity as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 320, a notification system 360 and a quantity prediction system 380. Web server 320, notification system 360 and/or quantity prediction system 380 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 320, notification system 360 and/or quantity prediction system 380. Additional details regarding web server 320, notification system 360 and/or quantity prediction system 380 are described herein.

In many embodiments, system 300 also can comprise electronic devices 340, 341, such as user computers or personal electronic devices. In other embodiments, electronic devices 340, 341 are external to system 300. Electronic devices 340, 341 can comprise any of the elements described in relation to computer system 100. In some embodiments, electronic devices 340 can be mobile devices and/or voice activated electronic devices. A voice activated device can refer to a device that is capable of receiving voice instructions from a user to perform tasks, with the capability to present audio and/or visual data (e.g., text, images, videos, music, etc.), in response to a voice inquiry and/or instruction by the user. For example, the voice activated device can comprise at least one of a cellular telephone (e.g. smartphone) or other portable electronic device, such as any of the portable electronic devices described below and/or digital home assistant, comprising voice-activated software to respond to voice instructions from a user. The voice activated device can generally comprise a microphone to listen to and/or receive voice instructions, and a speaker to relay audio output to the user. Examples of voice activated devices and/or software capable of providing voice activation on devices include the Google Home® device and Google Assistant® software from Google of Mountain View, Calif., United States of America, the Amazon Echo® device and Amazon Alexa® software from Amazon of Seattle, Wash., United States of America, and the Apple HomePod® and Siri® software from Apple of Cupertino, Calif., United States of America.

A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise user interfaces 342, 344, such as a graphical user interface ("GUI") and/or voice-activated user interface enabled by voice-activated software and/or on a voice-activated device. In the same or different embodiments, user interfaces 342, 344 can be part of and/or displayed by electronic devices 340, 341, which also can be part of system 300. In some embodiments, user interfaces 342, 344 can comprise voice based user interfaces, such as for example via any of the voice-activated devices and/or software described above. In some embodiments, user interfaces 342, 344 can comprise text and/or graphics (image) based user interfaces. In the same or different embodiments, user interfaces 342, 344 can comprise a heads up display ("HUD"). When user interfaces 342, 344 comprises a HUD, the user interfaces 342, 344 can be projected onto glass or plastic, displayed in midair as a hologram, or displayed on monitor 106 (FIG. 1). In various embodiments, user interfaces 342, 344 can be color or black and white. In many embodiments, user interfaces 342, 344 can comprise an application running on a computer system, such as computer system 100, electronic devices 340, 341, and/or web serve 320. In the same or different embodiments, user interfaces 342, 344 can comprise a website accessed through internet 330. In some embodiments, user interfaces 342, 344 can comprise an eCommerce website. In the same or different embodiments, user interfaces 342, 344 can be displayed as or on a virtual reality (VR) and/or augmented reality (AR) system or display. In many embodiments, an interaction with a GUI can be received by system 300. In some embodiments, an interaction with a GUI can comprise a click, a look, a selection, a grab, a view, a purchase, a bid, a pinch, a reverse pinch, a swipe, etc.

In some embodiments, web server 320 can be in data communication through Internet 330 with electronic devices (e.g., 340, 341). In certain embodiments, electronic devices 340, 341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, web server 320, notification system 360 and/or quantity prediction system 380 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 320, notification system 360 and/or quantity prediction system 380 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of a web server 320, notification system 360 and/or quantity prediction system 380. In a similar manner, the processing module(s) and the memory storage module(s) can be local and/or remote to each other.

In many embodiments, web server 320, notification system 360 and/or quantity prediction system 380 can be configured to communicate with one or more electronic devices 340 and 341. In some embodiments, electronic devices 340 and 341 also can be referred to as customer computers. In some embodiments, web server 320, notification system 360 and/or quantity prediction system 380 can communicate or interface (e.g., interact) with one or more customer computers (such as electronic devices 340 and 341) through a network or internet 330. Internet 330 can be an intranet that is not open to the public. (The intranet can be part of system 300.) Accordingly, in many embodiments, web server 320, notification system 360 and/or quantity prediction system 380 (and/or the software used by such systems) can refer to a back end of system 300 operated by an operator and/or administrator of system 300, and electronic devices 340 and 341 (and/or the software used by such systems) can refer to a front end of system 300 used by one or more users 350, 351, respectively. In some embodiments, users 350, 351 can also be referred to as customers, in which case, electronic devices 340, 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 320, notification system 360 and/or quantity prediction system 380 also can be configured to communicate with one or more databases. The one or more databases can comprise, for example, a product database that contains information about products, items, or SKUs (stock keeping units) sold by a retailer. In one embodiment, the one or more databases comprise a product database comprising a catalog of items 383, which contains information about items sold by a retailer. In another embodiment, the one or more databases comprise a household size database containing information about the sizes of households for users of the system 300. In another embodiment, the one or more databases comprises a prior transaction database that contains information about prior purchases and/or selections of items by users of the system, including information on the items purchased and/or selected by users and quantities thereof purchased and/or selected by the users. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 320, notification system 360 and/or quantity prediction system 380, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for improved quantity prediction of items for notification to a user, by providing a more accurate prediction of the quantity of the item the user is interested in selecting, for example for purchase thereof. In one example, the techniques described herein may facilitate increased efficiency of use of voice-activated devices and/or voice-based interfaces, by providing a more accurate prediction of item quantities for suggestion to a user, and thereby decreasing the number of voice commands a user is required to provide to complete a transaction, and/or improving the accuracy of the transaction. These techniques described herein can also provide a significant improvement over conventional approaches of requiring a user to initiate input for each specific quantity of items the user is interested in selecting, as the user may not be aware of the possible quantities of items that may be available, may not have a good estimate of the quantity that would be suitable for the user's household, business, etc., and/or may not remember or have readily accessible the quantities that the user has previously selected.

In one embodiment, these techniques described herein may provide significant improvements in the selection of items using a voice-activated device and/or voice-activated interface, such as for systems that do not also include a visual display to allow a user to select from predetermined quantities, by increasing the efficiency of the user's transaction via recommendation and/or notification of item quantities that are predicted to be suitable for the user. These techniques may allow a user to efficiently conduct transactions using a voice-activated device and/or voice-activated interface, for example without requiring excessive numbers of voice queries of the user and/or voice commands by the user, and without requiring the user to have access to accurate item quantity information prior to initiating a transaction.

In many embodiments, the techniques described herein can be used continuously at a scale that cannot be reasonably performed using manual techniques or the human mind. For example, the techniques herein may require extensive computational steps to predict item quantities based on extensive prior transaction histories for multiple users, predict household size and aggregate household item quantity information based on previously selected quantities, and calculate statistical values such as confidence intervals based on the vast amounts of data used in these calculations. The techniques described herein can require multiple calculation steps and decisions points that cannot reasonably be performed in a short enough period of time, using manual techniques or the human mind, to effectively facilitate purchase transactions occurring online and/or via a voice-activated user interface.

In a number of embodiments, the techniques described herein can solve a technical problem that arises only within the realm of computer networks, as online grocery orders and other online purchases do not exist outside the realm of computer networks.

In many embodiments, the techniques described herein can solve a technical problem ecommerce that cannot be solved outside the context of computer networks. Specifically, the techniques described herein cannot be used outside the context of computer networks as the calculations required cannot be performed without a computer system and/or network, and as facilitation of an online purchase transaction requires a computer system and/or network to receive purchase queries from an online user and to provide predicted quantity information to the online user via the computer system and/or network.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 320 (FIG. 3), notification system 360 (FIG. 3) and quantity prediction system 380 (FIG. 3). The processing module(s) can be similar or identical to the processing module(s) described above with respect to computer system 100 (FIG. 1).

In many embodiments, method 400 (FIG. 4) can comprise an activity 401 of receiving a user identifier from a user interface 342, 244 (FIG. 3) of an electronic device 340, 341 (FIG. 3), wherein the user identifier identifies a user from among a set of users. The user identifier can comprise, for example a customer identification number that identifies any of a particular individual, a business, or other customer, corresponding to the user 350, 351 (FIG. 3) of the system 300. In one example, the user identifier comprises a customer identification number corresponding to a customer seeking information about an item via the system 300 (FIG. 3). In one example, the user identifier can be received via user information input into the electronic device using the user interface, such as name or other login information input by the user that identifies the user 350, 351. As another example, the user identifier can be received by receiving identifying information associated with the electronic device 340, 341 being used by the user 350, 351. In one example, the set of users from which the user is identified can comprise at least some portion and even all of the users 350, 351 that have previously selected an item from a retailer in a predetermined period, such as via online purchase. In another example, the set of users from which the user is identified can comprise at least some portion and even all of the users 350, 351 for which prior transaction information is stored in the prior transactions database 382.

In certain embodiments, the method 400 (FIG. 4) can continue by comprising an activity 402 (FIG. 4) of receiving an item identifier associated with the user identifier, wherein the item identifier identifies an item in a catalog comprising a set of items. The catalog can comprise, for example, a catalog of all products available for purchase from a retailer, such as an online retailer and/or ecommerce retailer. In one example, the item identifier identifies an item in the catalog that the user 350, 351 (FIG. 3) has requested information about, such as purchase information, via the user interface 342, 344 (FIG. 3) of the electronic device 340, 341 (FIG. 3). As an example, the item identifier can identify a specific product available for sale from the catalog, such as a grocery item or other retail item. In one embodiment, when a user 350, 351 requests information about or otherwise indicates interest in an item, the system 300 is capable of receiving item information from the catalog of items 383 (FIG. 3), and associating the item identified by the user 350, 351 with its item identifier from the catalog. The item identifier can be, for example, a product name and/or number associated with a product, such as a SKU number or other identifier.

In certain embodiments, the method 400 (FIG. 4) can continue by comprising an activity 403 (FIG. 4) of determining user item quantity information related to quantities of the item previously selected by the user 350, 351 (FIG. 3) in first prior user transactions by the user 350, 351 involving the item in a predetermined time period. According to certain embodiments, the system 300 (FIG. 3) can access the prior transaction database 382 (FIG. 3) to identify all prior transactions the user 350, 351 has made with respect to the identified item. For example, the first prior user transactions can be identified by searching for all prior transactions involving the item corresponding to the item identifier, and made by the user 350, 351 (FIG. 3) that corresponds to the user identifier. The user item quantity information can include the quantities of the item selected (e.g., purchased) by the user 350, 351 for each selection of the item made by the user 350, 351 during the predetermined time period. For example, the user item quantity information can include quantities of the item selected by the user 350, 351 during a predetermined time period corresponding to the past year. As another example, the predetermined time period for which user item quantity information is provided can also correspond to a shorter period of time, such as weeks or months, or a longer period of time, such as the user's entire purchase and/or selection history for the item.

The user item quantity information can include any quantity metric for the item relevant to prior transactions, such as for example each weight and/or each number of the item selected by the user 350, 351 during the predetermined period. For example, for an item typically sold by weight, such as bulk goods or certain product, the user item quantity information can include each weight of the item selected by the user 350, 351 during the predetermined period. As another example, for an item typically sold individually, such as a gallon of milk, the user item quantity information can include each number of the item selected by the user 350, 351 during the predetermined period.

In certain embodiments, the method 400 (FIG. 4) can continue by comprising an activity 404 (FIG. 4) of determining a respective household size for each user 350, 351 (FIG. 3) in the set of users. According to certain embodiments, the system 300 (FIG. 3) can access the household size database 381 (FIG. 3) to obtain information about household size for each user 350, 351. The household size for each user 350, 351 can be obtained, for example, by information previously provided by each user 350, 351 about their household size, by correlating address information for each user 350, 351 to identify users in a same household, and/or by estimating a household size from information about the types and quantities of items previously purchased by the users 350, 351, among other methods. According to one embodiment, the respective household size for each user 350, 351 can be stored in the household size database 381 for access by the quantity prediction system 380 (FIG. 3) of the system 300. As an example, for a household having only one member, the household size is one, for a household having two members, the household size is two, and for a household having four members, the household size is four. Also, according to certain embodiments, the term "household" can be used to refer to a residential household to which each user 350, 351 belongs, but is not limited thereto, and can also be used to refer to a business or other organization to which each user 350, 351 belongs. For example, each household can comprise a set of users 350 located at and/or receiving purchased items at a same address corresponding to any of a residential household, business, or other organization.

In certain embodiments, the method 400 (FIG. 4) can continue by comprising an activity 405 (FIG. 4) of determining aggregate household item quantity information related to quantities of the item previously selected by each user 350, 351 (FIG. 3) in a portion of the set of users 350, 351, in first prior item transactions by the portion of the set of users 350, 351 involving the item in the predetermined time period, wherein each user 350, 351 in the portion of the set of users has a household size corresponding to the respective household size of the user 350, 351. Accordingly to certain embodiments, the aggregate household item quantity information can include the quantities of the item selected (e.g. purchased) by the portion of the set of users 350, 351 having the same household size as the user 350, 351 corresponding to the user identifier, for each selection of the item made by each user 350, 351 in the portion of the set of users during the predetermined time period. For example, the aggregate household item quantity information can include quantities of the item selected users 350, 351 having a same household size as the user 350, 351 corresponding to the user identifier during a predetermined time period corresponding to the past year. As another example, the predetermined time period for which aggregate household item quantity information is provided can also correspond to a shorter period of time, such as weeks or months, or a longer period of time, such as the entire purchase and/or selection history of the item for households having a same size as the user corresponding to the user identifier.

According to certain embodiments, the system 300 (FIG. 3) can access the household size database 381 (FIG. 3) to identify the set of users 350, 351 (FIG. 3) having the same household size as the user 350, 351 corresponding to the user identifier. In one example, once the set of users 350, 351 having the same household size has been determined, the system 300 (FIG. 3) can access the prior transaction database 382 (FIG. 3) to identify all prior transactions made with respect to the identified item for each user 350, 351 in the identified portion of the set of users having the same household size, during the predetermined time period. For example, the first prior user transactions can be identified by searching for all prior transactions involving the item corresponding to the item identifier, and made by the each of the users 350, 351 (FIG. 3) in the portion of the set of users identified as having the same household size as the user corresponding to the user identifier. The aggregate household item quantity information can include the quantities of the item selected (e.g. purchased) by each user 350, 351 in the portion of the set of users, for each selection of the item made by the users 350, 351 in the portion of the set of users during the predetermined time period. For example, the aggregate household item quantity information can include quantities of the item selected by the each of the users 350, 351 in the portion of the set of users during a predetermined time period corresponding to the past year. As another example, the predetermined time period for which aggregate household item quantity information is provided can also correspond to a shorter period of time, such as weeks or months, or a longer period of time, such as the entire purchase and/or selection history for the item for each user in the portion of the set of users.

In certain embodiments, the method 400 (FIG. 4) can continue by comprising an activity 406 (FIG. 4) of determining whether a quantity of the first prior user transactions by the user 350, 351 (FIG. 3) for the item, meets or exceeds a first threshold level. According to certain aspects, the first threshold level can be a level that provides some confidence that the number of prior user transactions by the user for the item is high enough that it can be used to at least partly predict future transactions by the same user 350, 351. In one example, the first threshold level is at least two, meaning that the quantity of first prior user transactions by the user 350, 351 in purchasing and/or selecting the item is at least two. The first threshold level can also be higher according to other examples.

According to certain embodiments, the method 400 (FIG. 4) can continue by comprising an activity 407 (FIG. 4) of, when the quantity of the first prior user transactions is determined to meet or exceed the first threshold level, determining a recommended quantity of the item for notification to the user 350, 351 (FIG. 3) based on the user item quantity information. That is, in a case where the quantity of first prior user transactions meets or exceeds the first threshold level, the recommended quantity of the item is determined according to the user's own transaction history with respect to the item. According to one embodiment, the recommended quantity of the item is determined by selecting, as the recommended quantity, either a most frequently selected quantity of the item selected by the user 350, 351, or a median selected quantity of the item selected by the user 350, 351. For example, the system 300 can access the prior transactions database to retrieve information for determining metrics such as how frequently each quantity of the item was selected and/or purchased by the user in the predetermined period, and/or a median quantity of the item selected and/or purchased by the user 350, 351 during the predetermined period.

According to certain embodiments, either the most frequently selected and/or purchased quantity, or the median selected and/or purchased quantity can be determined for notification to the user, according to how predictive each is of a suitable quantity for recommendation to the user 350, 351. For example, if the user has selected a predetermined quantity of the item with a relatively high frequency during the predetermined period, then it can be a good predictor of a suitable recommended quantity. However, if a user has not reliably selected a predetermined quantity with a high frequency, and/or has selected and/or purchased a variety of different quantities of the item during the predetermined period, then a median selected quantity for all purchases and/or selections of the item by the user during the predetermined period may be a better predictor of a suitable recommended quantity. According to one example, when the user has selected a quantity of the item with a frequency of more than one (i.e., the user has selected a same quantity of the item at least twice during the predetermined period), then the most frequently selected quantity can be determined as the recommended quantity of the item for notification to the user. According to another embodiment, when the user has not selected a same quantity of the item more than once during the predetermined period, or when there is no quantity that has been selected with a higher frequency than other quantities, then a median selected quantity of the item is determined as the recommended quantity of the item for notification to the user. According to one embodiment, outliers to one or more of the most frequently selected quantity and/or the median can also be removed from the set of quantities to improve the accuracy of the determined quantity for notification to the user 350, 351. For example, according to one embodiment, quantities that are more than two standard deviations away from the mean quantity may be discarded as outliers that should not be considered in determining the median quantity.

According to certain embodiments, the method 400 (FIG. 4) can continue by comprising an activity 408 (FIG. 4) of, when the quantity of the first prior user transactions is determined to be greater than zero but does not meet or exceed the first threshold level, determining the recommended quantity of the item for notification to the user 350, 351 (FIG. 3) based on the aggregate household item quantity information. That is, when first prior user transactions includes at least one prior transaction for the user in the predetermined period with respect to the item, but the number of transactions does not meet or exceed the first threshold level, then the aggregate household item quantity information can be used to predict a suitable quantity of the item for recommendation to the user 350, 351, instead of relying solely on the user's own prior transaction history.

Referring to FIG. 5, according to certain embodiments, the activity 408 further comprises an activity 501 of determining an item confidence interval for the aggregate household item quantity information for the item for the household size corresponding to the respective household size of the user 350, 351 (FIG. 3). According to certain embodiments, the item confidence interval corresponds to an interval of quantities for which there is a predetermined probability that households having the same household size as the user 350, 351, selected a quantity within the interval, during prior transactions made by the households of the same size in the predetermined period of time. For example, the confidence interval can comprise a tolerance interval where x % of the population of quantities selected by households of the same size lie within the interval with a probability of p. According to one example, the confidence interval can be centered around either the most frequently selected quantity or the median selected quantity by the households having the same size as the user, depending on the frequency with which the quantity has been selected.

As an example, according to one embodiment, the confidence interval p for a population of selected quantities with probability γ is as in Formula (1) follows:

$$\tilde{x} \pm k_2 \sigma \qquad \text{Formula (1)(p)}$$

$$k_2 = z_{(1-p)/2} \sqrt{\frac{(n-1)\left(1 + \frac{1}{n}\right)}{\chi^2_{\gamma,n-1}} \left(1 + \frac{(n-3) - \chi^2_{\gamma,n-1}}{2(n+1)^2}\right)}$$

where $\tilde{x}$ is the population parameter;
if the frequency of the mode >1, then $\tilde{x}$=mode;
else $\tilde{x}$=Median;
σ is the standard deviation of the sample;
z is the critical value of the normal distribution associated with cumulative probability (1−p)/2. For example, it can be obtained from the cumulative distribution function of the standard normal distribution and can be built as a look-up table for the usual confidences (90%, 95%, 99%, etc.);
n is the number of samples; and
$\chi^2_{\gamma,\,n-1}$ is the $\chi^2$ with n−1 degrees of freedom that is exceeded with probability γ. $\chi^2$ refers to the critical value of the chi-square distribution with n−1 degrees of freedom that is exceeded with probability gamma. In certain cases, this can be similar to obtaining the critical value for the standard normal distribution from its cumulative distribution function, as discussed above.

Referring again to FIG. 5, according to certain embodiments, the activity 408 further comprises an activity 502 of determining whether a most frequently selected quantity of the item is within the item confidence interval for the item. The activity 408 can further comprise an activity 503 (FIG. 5) of, when the most frequently selected quantity is determined to be within the item confidence interval for the item, selecting, as the recommended quantity, the most frequently selected quantity of the item. That is, the most frequently selected quantity of the item selected by the user can be determined as the recommended quantity, in a case where this most frequently selected quantity falls within the item confidence interval as determined from the aggregate household quantity information for households having the same size as the user. According to yet another embodiment, when the most frequently selected quantity of the item selected by the user does not fall within the item confidence interval, then median of the quantities selected by the households having the same size as the user can be determined as the recommended quantity, with any outliers (such as outliers outside a 2σ interval of the mean for the household size) being removed for purposes of calculating this median.

Returning to FIG. 4, in many embodiments, the method 400 (FIG. 4) further comprises activity 409 of updating the user interface 342, 344 (FIG. 3) of the electronic device 340, 341 (FIG. 3) to notify the user of the recommended quantity of the item. For example, when the user interface 342, 344 is a voice-based interface, the user 350, 351 (FIG. 3) can be notified of the recommended quantity of the item by an audio communication to the user 350, 351 via the interface 342, 344, such as a spoken message provided via the interface 342, 344 suggesting the recommended quantity. As another example, when the interface 342, 344 comprises a visual display, the recommended quantity can be displayed to the user 350, 351. Accordingly, in certain embodiments, a user can be notified of the quantity that is recommended for the item the user 350, 351 is interest in selecting.

According to certain embodiments, when there are no prior transactions relating to the item for the user, in certain embodiments the method 400 can comprise evaluating whether there are any prior transactions for the user relating to a same product-type as the item, as opposed to the item itself, as is discussed in further detail below. According to yet another embodiment, when the most frequently selected quantity selected by the user is not within the item confidence interval, the method 400 can similarly comprise evaluating whether there are any prior transactions for the user relating to the same product-type as the item, as opposed to the item itself, as is discussed in further detail below.

Referring to FIG. 6, in some embodiments, method 400 can further comprise activity 410 of receiving product-type information that identifies one or more products of a type related to the item. Activity 410 can occur after activity 409 (FIG. 4) in method 400. For example, regarding activity 410, the system 300 (FIG. 3) can be capable of accessing information stored in the catalog of items 383 (FIG. 3) to identify products having the same or similar type to the item. According to certain embodiments, a product related to the item can be a product having the same or similar characteristics to the item, and/or can comprise a product that can be substituted for the item. For example, for an item corresponding to milk, one or more products of a type related thereto can comprise any of soy milk, almond milk, other brands of milk other than the brand of the item specified, and/or possibly other related dairy products.

In certain embodiments, the method 400 can further comprise activity 411 (FIG. 6) of, when the quantity of first prior user transactions is determined to be zero, determining user product type quantity information related to quantities of the one or more products of the type related to the item previously selected by the user in second prior user transactions by the user 350, 351 (FIG. 3) involving the one or more products of the type related to the item. That is, when the user 350, 351 has not previously purchased the item, and so has no first prior user transactions for that item, the method can comprise determining the prior transactions by the user for any products that have been determined to be of the type related to the item. For example, in a case where the item is a brand of milk, and where one or more products of the type related to the item have been identified as soy milk and almond milk, the user's prior transaction history with respect to soy milk and almond milk can be determined as the second prior user transactions. The user product type quantity information for the one or more products previously selected by the user in second prior user transactions can be determined in a manner similar to that used to determine the user item quantity information in first prior user transactions above. In certain embodiments, the second prior user transactions can comprise transactions that occurred at the same time as one or more of the first prior user transactions. In other embodiments, the second prior user transactions include transactions that occurred at times separate from the first prior user transactions.

According to certain embodiments, to determine the user product type quantity information for the second prior user transactions, the system 300 (FIG. 3) can access the prior transaction database 382 (FIG. 3) to identify all prior transactions the user 350, 351 has made with respect to the one or more products of the type related to the item. For example, the second prior user transactions can be identified by searching for all prior transactions involving the one or more products of the type related to the item corresponding to the item identifier, and made by the user 350, 351 (FIG. 3). The user product type quantity information can include the quantities of the one or more products selected (e.g. purchased) by the user 350, 351 for each selection of the item made by the user 350, 351 during a predetermined time period. For example, the user product type quantity information can include quantities of the one or more products selected by the user 350, 351 during a predetermined time period corresponding to the past year. As another example, the predetermined time period for which user product type quantity information is provided can also correspond to a shorter period of time, such as weeks or months, or a longer period of time, such as the user's entire purchase and/or selection history for the one or more products. According to certain embodiments, the predetermined time period evaluated for the second prior user transactions may be the same or a different time period than that evaluated for the first prior user transactions.

In certain embodiments, the method 400 can further comprise activity 412 (FIG. 6) of determining aggregate household product type quantity information related to quantities of the one or more products of the type related to the item previously selected by each user 350, 351 (FIG. 3) in the portion of the set of users in second prior item transactions by the portion of the set of users involving the one or more products of the type related to the item. For example, the aggregate household product type quantity information can comprise information on the quantities of the one or more products of the type related to the item that have been selected (e.g., purchased) by households having a same size as the user 350, 351. According to certain embodiments, the aggregate household product type quantity information can be determined similarly to the aggregate household item quantity information described above. For example, accordingly to certain embodiments, the aggregate household product type quantity information can include the quantities of the one or more products of the type related to the item purchased and/or selected by the portion of the set of users 350, 351 having the same household size as the user 350, 351 corresponding to the user identifier, for each selection of the products made by each user 350, 351 in the portion of the set of users during the predetermined time period. For example, the aggregate household product type quantity information can include quantities of the one or more products selected by users 350, 351 having a same household size as the user 350, 351 corresponding to the user identifier during a predetermined time period corresponding to the past year. As another example, the predetermined time period for which aggregate household product type quantity information is provided can also correspond to a shorter period of time, such as weeks or months, or a longer period of time, such as the entire purchase and/or selection history of the item for households having a same size as the user corresponding to the user identifier.

According to certain embodiments, the system 300 (FIG. 3) can access the household size database 381 (FIG. 3) to identify the set of users 350, 351 (FIG. 3) having the same household size as the user 350, 351 corresponding to the user identifier. In one example, once the set of users 350, 351 having the same household size has been determined, the system 300 (FIG. 3) can access the prior transaction database 382 (FIG. 3) to identify all prior transactions made with respect to the one or more products of the type related to the item for each user 350, 351 in the identified portion of the set of users having the same household size, during the predetermined time period. For example, the second prior user transactions can be identified by searching for all prior transactions involving the one or more products of the type related to the item corresponding to the item identifier, and made by the each of the users 350, 351 (FIG. 3) in the portion of the set of users identified as having the same household size as the user corresponding to the user identifier. The aggregate household product type quantity information can include the quantities of the one or more products selected by each user 350, 351 in the portion of the set of users, for each purchase and/or selection of the one or more products made by the users 350, 351 in the portion of the set of users during the predetermined time period. For example, the aggregate household product type item information can include quantities of the one or more products of the type related to the item selected by the each of the users 350, 351 in the portion of the set of users during a predetermined time period corresponding to the past year. As another example, the predetermined time period for which aggregate household product type quantity information is provided can also correspond to a shorter period of time, such as weeks or months, or a longer period of time, such as the user's entire purchase and/or selection history for the one or more products for each user in the portion of the set of users.

In certain embodiments, the method 400 can further comprise activity 413 (FIG. 6) of determining whether a quantity of the second prior user transactions meets or exceeds a second threshold level. Similarly to activity 406 (FIG. 4) above, according to certain aspects, the second threshold level can be a level that provides some confidence that the number of the second prior user transactions by the user for the one or more products of the type related to the item is high enough that it can be used to predict future transactions by the same user 350, 351 (FIG. 3) for the item. In one example, the second threshold level is at least two, meaning that the quantity of second prior user transactions by the user 350, 351 in selecting the one or more products of the same type as the item is at least two. The second threshold level can also be higher according to other examples. According to certain embodiments, the second threshold level can be the same as, or different than, the first threshold level.

According to many embodiments, the method 400 can further comprise activity 414 (FIG. 6) of, when the quantity of the second prior user transactions is determined to meet or exceed the second threshold level, determining the recommended quantity of the item for notification to the user based on the user product type quantity information. Similarly to activity 407 (FIG. 4) above, in a case where the second prior user transactions meets or exceeds the second threshold level, the recommended quantity of the item is determined according to the user's own transaction history with respect to the one or more products of the type related to the item. According to one embodiment, the recommended quantity of the item is determined by selecting, as the recommended quantity, either a most frequently selected quantity of the one or more products of the type related to the item selected by the user 350, 351 (FIG. 3), or a median selected quantity of the one or more products of the type related to the item and selected by the user 350, 351. For example, the system 300 can access the prior transactions database to retrieve information for determining metrics such as how frequently each quantity of the one or more products was selected and/or purchased by the user in the predetermined period, and/or a median quantity of the one or more products selected and/or purchased by the user 350, 351 during the predetermined period.

According to certain embodiments, either the most frequently selected and/or purchased quantity of the one or more products, or the median selected and/or purchased quantity of the one or more products can be determined for notification to the user, according to how predictive each is of the a suitable quantity for recommendation to the user 350, 351. For example, if the user has selected a predetermined quantity of the one or more products of the type related to the item with a relatively high frequency during the predetermined period, then it can be a good predictor of a suitable recommended quantity. However, if a user has not reliably selected a predetermined quantity with a high frequency, and/or has selected a variety of different quantities of the one or more products of the type related to the item during the predetermined period, then a median selected quantity for all selections of the one or more products of the type related to the item by the user during the predetermined period can be a good predictor of a suitable recommended quantity. According to one example, when the user has selected a quantity of the one or more products of the type related to the item with a frequency of more than one (i.e., the user has selected a same quantity of the one or more products of the type related to the item at least twice during the predetermined period), then the most frequently selected quantity can be determined as the recommended quantity of the item for notification to the user. According to another embodiment, when the user has not selected a same quantity of the one or more products of the type related to the item more than once during the predetermined period, or when there is no quantity that has been selected with a higher frequency than other quantities, then a median selected quantity of the one or more products is determined as the recommended quantity of the item for notification to the user. According to one embodiment, outliers to one or more of the most frequently selected quantity and/or the median can also be removed from the set of quantities to improve the accuracy of the determined quantity for notification to the user 350, 351. For example, according to one embodiment, quantities that are more than two standard deviations away from the mean quantity may be discarded as outliers that should not be considered in determining the median quantity.

According to many embodiments, the method 400 can further comprise activity 415 (FIG. 6) of, when the quantity of the second prior user transactions is determined to be greater than zero but does not meet or exceed the second threshold level, determining the recommended quantity of the item for notification to the user based on the aggregate household product type quantity information. Similarly to activity 408 described above, when second prior user transactions includes at least one prior transaction for the user in the predetermined period with respect to the one or more products of the type related to the time, but the number of transactions does not meet or exceed the second threshold level, then the aggregate household product type quantity information can be used to predict a suitable quantity of the item for recommendation to the user 350, 351, instead of relying solely on the user's own prior transaction history.

Figure 7:
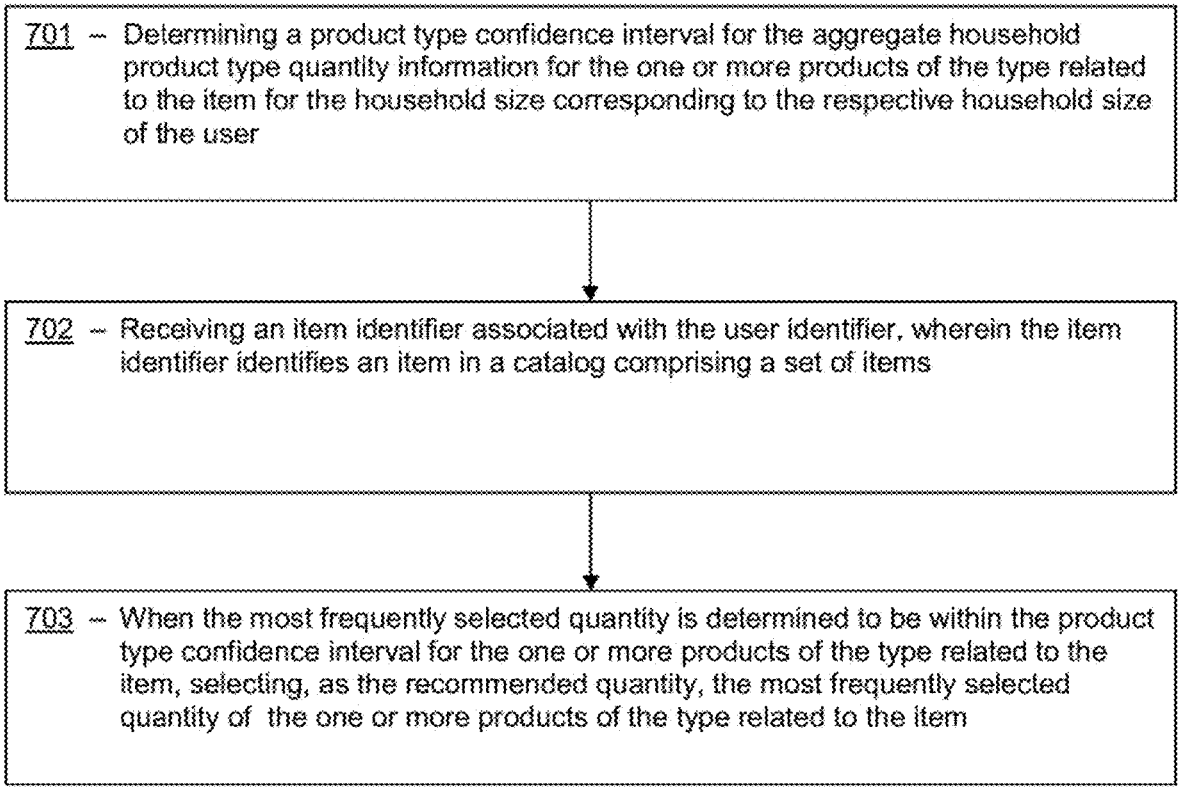
FIG. 7 illustrates a flowchart for an activity in the method depicted in FIG. 6, according to certain embodiments.

Referring to FIG. 7, according to certain embodiments, the activity 415 further comprises an activity 701 of determining a product type confidence interval for the aggregate household product type quantity information for the one or more products of the type related to the item for the household size corresponding to the respective household size of the user 350, 351 (FIG. 3). According to certain embodiments, the product confidence interval corresponds to an interval of quantities for which there is a predetermined probability that households having the same household size as the user 350, 351, selected a quantity within the interval, during prior transactions made by the households of the same size in the predetermined period of time. For example, the confidence interval can comprise a tolerance interval where x % of the population of quantities selected by households of the same size lie within the interval with a probability of p. According to one example, the product type confidence interval can be centered around either the most frequently selected quantity or the median selected quantity by the households having the same size as the user, depending on the frequency with which the quantity has been selected. As an example, according to one embodiment, a product type confidence interval comprises a confidence interval p for a population of selected quantities with probability γ, and can be calculated according to Formula (1) above.

Referring again to FIG. 7, according to certain embodiments, the activity 415 further comprises an activity 702 of determining whether a most frequently selected quantity of the one or more products of the type related to the item is within the product type confidence interval for the one or more products of the type related to the item. The activity 415 can further comprise an activity 703 (FIG. 5) of, when the most frequently selected quantity is determined to be within the product type confidence interval, selecting, as the recommended quantity, the most frequently selected quantity of the one or more products of the type related to the item. That is, the most frequently selected quantity of the one or more products of the type related to the item, selected by the user, can be determined as the recommended quantity, in a case where this most frequently selected quantity falls within the product type confidence interval as determined from the aggregate household product type quantity information for households having the same size as the user. According to yet another embodiment, when the most frequently selected quantity of the one or more products of the type related to the item, selected by the user does not fall within the product type confidence interval, then median of the quantities selected by the households having the same size as the user can be determined as the recommended quantity, with any outliers (such as outliers outside a 2σ interval of the mean) being removed for purposes of calculating this median.

According to one embodiment, the method 400 (FIGS. 4, 6) provides for determination of the recommended quantity of the item when the quantity of both the first prior user transactions is determined to be zero and the quantity of second prior user transactions is determined to be zero, by determining the recommended quantity of the item for notification to the user 350, 351 (FIG. 3) based on one or more of the aggregate household item quantity information or the aggregate household product type quantity information.

Referring to FIG. 8, according to one embodiment, the method 400 further comprises an activity 419 (FIG. 8), of determining whether the quantity of the first prior item transactions meets or exceeds a third threshold level. Activity 419 can occur after activity 415 (FIG. 6) in method 400. This third threshold in activity 419 level may be the same as or different than either of the first and second threshold levels. In certain embodiments, when the third threshold is met, this may be indicative that a sufficient number of transactions with respect to the item for the portion of the set of users having the same household size as the user may be adequate to use as a basis for providing a recommendation on quantity of the item to the user. The method 400 can further comprise activity 420 of, when the quantity of the first prior item transactions by the portion of the set of users is determined to meet or exceed the third threshold level, selecting, as the recommended quantity, either a most frequently selected quantity of the item selected by each user in the portion of the set of users in the first prior item transactions, or a median selected quantity of the item selected by each user in the portion of the set of users in the first prior item transactions.

Referring to FIG. 9, according to one embodiment, the method 400 further comprises activity 421 (FIG. 9) of, when the quantity of the first prior item transactions by the portion of the set of users is determined to be greater than zero but does not meet or exceed the third threshold level, and determining whether the quantity of the second prior item transactions meets or exceeds a fourth threshold level. Activity 421 can occur after activity 420 (FIG. 8). This fourth threshold level in activity 422 (FIG. 9) may be the same as or different than either of the first, second and third threshold levels. In certain embodiments, when the fourth threshold is met, this may be indicative that a sufficient number of transactions with respect to the one or more products of the type related to the item for the portion of the set of users having the same household size as the user may be adequate to use as a basis for providing a recommendation on quantity of the item to the user. The method 400 can further comprise an activity 422 of, when the quantity of the second prior item transactions is determined to meet or exceed the fourth threshold level, selecting, as the recommended quantity, either a most frequently selected quantity of the one or more products of the type related to the item selected by each user in the portion of the set of users in the second prior item transactions, or a median selected quantity of the one or more products of the type related to the item selected by selected by each user in the portion of the set of users in the second prior item transactions.

Furthermore, according to certain embodiments, when none of the first, second, third or fourth threshold levels are met, then a default value for the item quantity can be suggested to the user. According to yet another embodiment, the method 400 can further comprise determining a cluster of products having product attributes related to the individual item, and when the quantity of the first prior user transactions is determined to be zero, determining the recommended quantity of the item for notification to the user based on quantities of the products in the cluster of products selected by either the user or the portion of the set of users in a predetermined time period. For example, the cluster of products can include products having characteristics similar to the item, that share some similarity with the item, or that have otherwise been clustered with the item as being at least partly predictive of quantities for the item.

Figure 10:
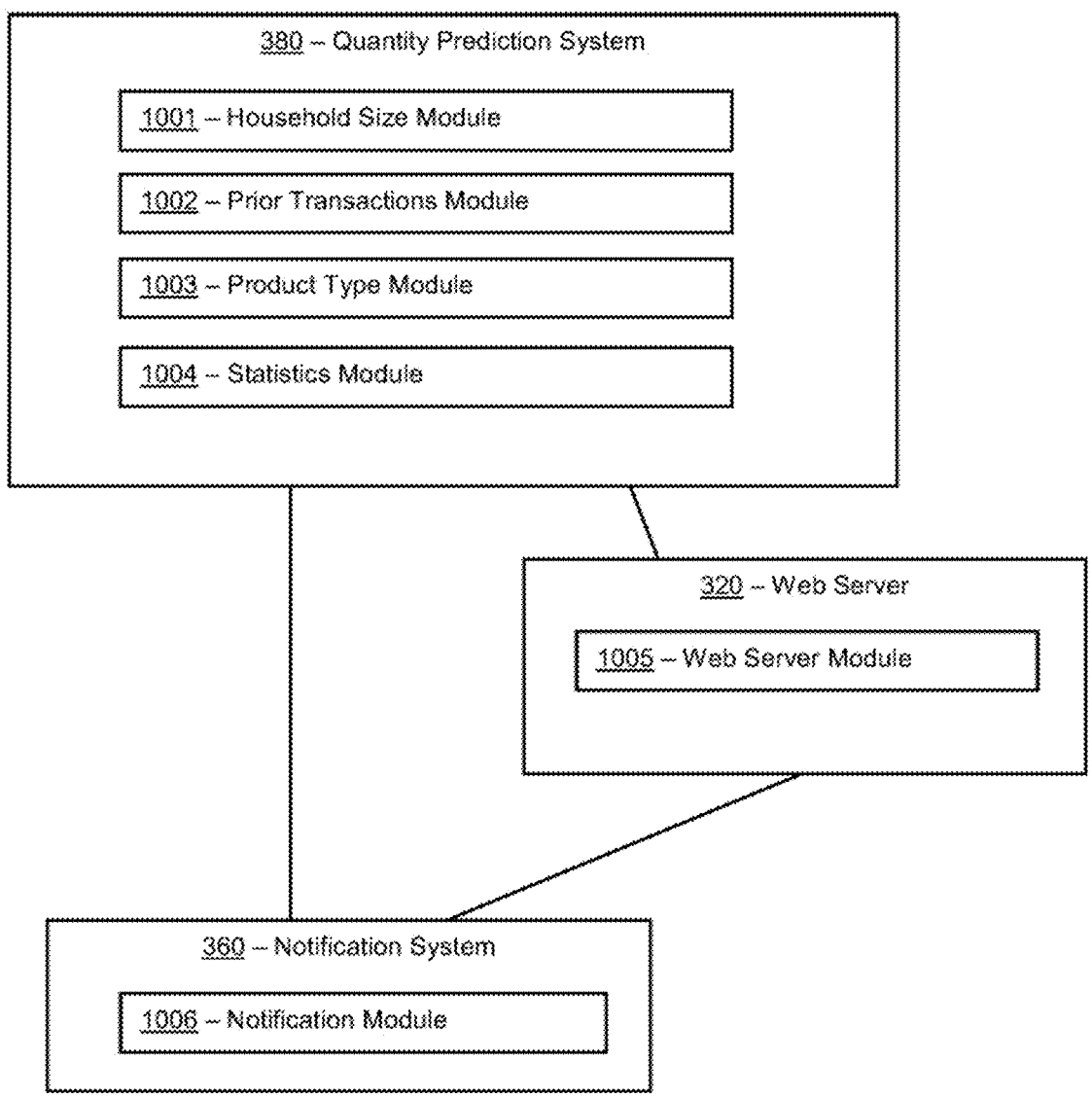
FIG. 10 illustrates a representative block diagram of a system, according to an additional embodiment.

Turning ahead in the drawings, FIG. 10 illustrates a block diagram of the system 300 that can be employed for the method herein. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 30 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can comprise non-transitory memory storage module 1001. Memory storage module 1001 can be referred to as Household Size Module 1001. In many embodiments, Household Size Module 1001 can store computing instructions configured to run on one or more processing modules and perform one or more acts of method 400 (FIG. 4) (e.g., activity 404 (FIG. 4)).

In many embodiments, system 300 can comprise non-transitory memory storage module 1002. Memory storage module 1002 can be referred to as Prior Transactions Module 1002. In many embodiments, Prior Transactions Module can store computing instructions configured to run on one or more processing modules and perform one or more acts of method 400 (FIGS. 4, 6, 8 and 9) (e.g., activity 403 and 405-408 (FIG. 4), activity 411-415 (FIG. 6), activity 419-420 (FIG. 8), and activity 421-422 (FIG. 9)).

In many embodiments, system 300 can comprise non-transitory memory storage module 1003. Memory storage module 1003 can be referred to as Product Type Module 1003. In many embodiments, Product Type Module can store computing instructions configured to run on one or more processing modules and perform one or more acts of method 400 (FIG. 4) (e.g., activities 410-15 (FIG. 6)).

In many embodiments, system 300 can comprise non-transitory memory storage module 1004. Memory storage module 1004 can be referred to as Statistics Module 1004. In many embodiments, Statistics Module 1004 can store computing instructions configured to run on one or more processing modules and perform one or more acts of method 400 (FIG. 4) (e.g., activity 501 (FIG. 5), and activity 701 (FIG. 7)).

In many embodiments, system 300 can comprise non-transitory memory storage module 1005, for example as a part of the web server 320. Memory storage module 1005 can be referred to as Web Server Module 1005. In many embodiments, Web Server Module 1005 can store computing instructions configured to run on one or more processing modules and perform one or more acts of method 400 (FIG. 4) (e.g., activity 401 and 402 (FIG. 4)).

In many embodiments, system 300 can comprise non-transitory memory storage module 1006. Memory storage module 1006 can be referred to as Notification Module 1006. In many embodiments, Notification Module can store computing instructions configured to run on one or more processing modules and perform one or more acts of method 400 (FIG. 4) (e.g., activity 409 (FIG. 4)).

Although systems and methods for the prediction of item quantity have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-17 may be modified, and that the foregoing discussion of certain of these embodiments does not necessarily represent a complete description of all possible embodiments. For example, one or more of the procedures, processes, or activities of FIGS. 4-9 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions, that when executed on the one or more processors, cause the one or more processors to perform:
receiving a user identifier from a user interface of an electronic device, wherein the user identifier identifies a user from among a set of users;
receiving an item identifier associated with the user identifier, wherein the item identifier identifies an item in a catalog comprising a set of items;
receiving product-type information that identifies one or more products of a type related to the item;
determining user item quantity information related to quantities of the item previously selected by the user in first prior user transactions by the user involving the item in a predetermined time period;
determining a respective household size for each user in the set of users;
determining aggregate household item quantity information related to quantities of the item previously selected by each user in a portion of the set of users in first prior item transactions by the portion of the set of users involving the item in the predetermined time period, wherein each user in the portion of the set of users has a household size corresponding to the respective household size of the user;
generating, using a combination of two learning models comprising a generator model and a discriminator model, a predicted quantity of the item from latent data, wherein the latent data is used as input into the generator model to output generated data to learn a distribution of real data, and wherein the generated data that is output from the generator model and the real data are used as input into the discriminator model to estimate a distribution of the latent data to a real dataset;
using a respective loss function that specifies a generator loss for the generated data that is output from the generator model and a discriminator loss for an output of the discriminator model;
propagating the combination of the generator loss and the discriminator loss back through the generator model until the discriminator model can no longer distinguish the generated data from the real data in the real dataset;
determining whether a quantity of the first prior user transactions by the user meets or exceeds a first threshold level;
when the quantity of the first prior user transactions is determined to meet or exceed the first threshold level, determining a recommended quantity of the item for notification to the user based on the user item quantity information and updating the user interface of the electronic device to notify the user of the recommended quantity of the item;

when the quantity of the first prior user transactions is determined to be greater than zero but does not meet or exceed the first threshold level, determining the recommended quantity of the item for notification to the user based on the aggregate household item quantity information and updating the user interface of the electronic device to notify the user of the recommended quantity of the item;

when the quantity of the first prior user transactions is determined to be zero, determining user product type quantity information related to quantities of the one or more products of the type related to the item previously selected by the user in second prior user transactions by the user involving the one or more products of the type related to the item; and determining an aggregate household product type quantity information related to quantities of the one or more products of the type related to the item previously selected by each user in the portion of the set of users in second prior item transactions by the portion of the set of users involving the one or more products of the type related to the item.

2. The system of claim 1, wherein determining the recommended quantity of the item for notification to the user based on the user item quantity information comprises:
selecting, as the recommended quantity, either a most frequently selected quantity of the item selected by the user, or a median selected quantity of the item selected by the user,
wherein:
the generator model comprises a long short term memory recurrent neural network; and
the discriminator model comprises a convolutional neural network.

3. The system of claim 1, wherein determining the recommended quantity of the item for notification to the user based on the aggregate household item quantity information, comprises:
determining an item confidence interval for the aggregate household item quantity information for the item for the household size corresponding to the respective household size of the user;
determining whether a most frequently selected quantity of the item is within the item confidence interval for the item; and
when the most frequently selected quantity is determined to be within the item confidence interval for the item, selecting, as the recommended quantity, the most frequently selected quantity of the item.

4. The system of claim 1, wherein the computing instructions, when executed on the one or more processors, further cause the one or more processors to perform:
determining whether a quantity of the second prior user transactions meets or exceeds a second threshold level;
when the quantity of the second prior user transactions is determined to meet or exceed the second threshold level, determining the recommended quantity of the item for notification to the user based on the user product type quantity information and updating the user interface of the electronic device to notify the user of the recommended quantity of the item; and
when the quantity of the second prior user transactions is determined to be greater than zero but does not meet or exceed the second threshold level, determining the recommended quantity of the item for notification to the user based on the aggregate household product type quantity information and updating the user interface of the electronic device to notify the user of the recommended quantity of the item.

5. The system of claim 4, wherein determining the recommended quantity of the item for notification to the user based on the user product type quantity information comprises:
selecting, as the recommended quantity, either a most frequently selected quantity of the one or more products of the type related to the item selected by the user, or a median selected quantity of the one or more products of the type related to the item selected by the user.

6. The system of claim 4, wherein determining the recommended quantity of the item for notification to the user based on the aggregate household product type quantity information comprises:
determining a product type confidence interval for the aggregate household product type quantity information for the one or more products of the type related to the item for the household size corresponding to the respective household size of the user.

7. The system of claim 4, wherein the computing instructions, when executed on the one or more processors, further cause the one or more processors to perform:
determining whether a most frequently selected quantity of the one or more products of the type related to the item is within product type confidence interval for the one or more products of the type related to the item;
when the most frequently selected quantity is determined to be within the product type confidence interval for the one or more products of the type related to the item, selecting, as the recommended quantity, the most frequently selected quantity of the one or more products of the type related to the item; and
when the quantity of the first prior user transactions is determined to be zero and when a quantity of the second prior user transactions is determined to be zero, determining the recommended quantity of the item for notification to the user based on the aggregate household item quantity information or aggregate household product type quantity information and updating the user interface of the electronic device to notify the user of the recommended quantity of the item.

8. The system of claim 7, wherein determining the recommended quantity of the item for notification to the user based on the aggregate household item quantity information, comprises:
determining whether the quantity of the first prior item transactions meets or exceeds a third threshold level; and
when the quantity of the first prior item transactions is determined to meet or exceed the third threshold level, selecting, as the recommended quantity, either most frequently selected quantity of the item selected by each user in the portion of the set of users in the first prior item transactions, or a median selected quantity of the item selected by each user in the portion of the set of users in the first prior item transactions.

9. The system of claim 7, wherein determining the recommended quantity of the item for notification to the user based on the aggregate household product type quantity information, comprises:

determining whether the quantity of the first prior item transactions meets or exceeds a third threshold level;

when the quantity of the first prior item transactions by the portion of the set of users is determined to be greater than zero but does not meet or exceed the third threshold level, determining whether the quantity of the second prior item transactions meets or exceeds a fourth threshold level; and when the quantity of the second prior item transactions is determined to meet or exceed the fourth threshold level, selecting, as the recommended quantity, either a most frequently selected quantity of the one or more products of the type related to the item selected by each user in the portion of the set of users in the second prior item transactions, or a median selected quantity of the one or more products of the type related to the item selected by each user in the portion of the set of users in the second prior item transactions.

10. The system of claim 1, wherein the computing instructions, when executed on the one or more processors, further cause the one or more processors to perform:

determining a cluster of products having product attributes related to the item; and when the quantity of the first prior user transactions is determined to be zero, determining the recommended quantity of the item for notification to the user based on quantities of products in the cluster of products selected by either the user or the portion of the set of users in a predetermined time period and updating the user interface of the electronic device to notify the user of the recommended quantity of the item.

11. A method implemented via execution of computing instructions configured to run at one or more processors and configured to be stored at non-transitory computer-readable media, the method comprising:

receiving a user identifier from a user interface of an electronic device, wherein the user identifier identifies a user from among a set of users;

receiving an item identifier associated with the user identifier, wherein the item identifier identifies an item in a catalog comprising a set of items;

receiving product-type information that identifies one or more products of a type related to the item;

determining user item quantity information related to quantities of the item previously selected by the user in first prior user transactions by the user involving the item in a predetermined time period;

determining a respective household size for each user in the set of users;

determining aggregate household item quantity information related to quantities of the item previously selected by each user in a portion of the set of users in first prior item transactions by the portion of the set of users involving the item in the predetermined time period, wherein each user in the portion of the set of users has a household size corresponding to the respective household size of the user;

generating, using a combination of two learning models comprising a generator model and a discriminator model, a predicted quantity of the item from latent data, wherein the latent data is used as input into the generator model to output generated data to learn a distribution of real data, and wherein the generated data that is output from the generator model and the real data are used as input into the discriminator model to estimate a distribution of the latent data to a real dataset;

using a respective loss function that specifies a generator loss for the generated data that is output from the generator model and a discriminator loss for an output of the discriminator model;

propagating the combination of the generator loss and the discriminator loss back through the generator model until the discriminator model can no longer distinguish the generated data from the real data in the real dataset;

determining whether a quantity of the first prior user transactions by the user meets or exceeds a first threshold level;

when the quantity of the first prior user transactions is determined to meet or exceed the first threshold level, determining a recommended quantity of the item for notification to the user based on the user item quantity information and updating the user interface of the electronic device to notify the user of the recommended quantity of the item;

when the quantity of the first prior user transactions is determined to be greater than zero but does not meet or exceed the first threshold level, determining the recommended quantity of the item for notification to the user based on the aggregate household item quantity information and updating the user interface of the electronic device to notify the user of the recommended quantity of the item;

when the quantity of the first prior user transactions is determined to be zero, determining user product type quantity information related to quantities of the one or more products of the type related to the item previously selected by the user in second prior user transactions by the user involving the one or more products of the type related to the item; and determining an aggregate household product type quantity information related to quantities of the one or more products of the type related to the item previously selected by each user in the portion of the set of users in second prior item transactions by the portion of the set of users involving the one or more products of the type related to the item.

12. The method of claim 11, wherein determining the recommended quantity of the item for notification to the user based on the user item quantity information comprises:

selecting, as the recommended quantity, either a most frequently selected quantity of the item selected by the user, or a median selected quantity of the item selected by the user, wherein:

the generator model comprises a long short term memory recurrent neural network; and the discriminator model comprises a convolutional neural network.

13. The method of claim 11, wherein determining the recommended quantity of the item for notification to the user based on the aggregate household item quantity information, comprises:

determining an item confidence interval for the aggregate household item quantity information for the item for the household size corresponding to the respective household size of the user;

determining whether a most frequently selected quantity of the item is within the item confidence interval for the item; and when the most frequently selected quantity is determined to be within the item confidence interval for the item, selecting, as the recommended quantity, the most frequently selected quantity of the item.

14. The method of claim 11, further comprising:
  determining whether a quantity of the second prior user transactions meets or exceeds a second threshold level;
  when the quantity of the second prior user transactions is determined to meet or exceed the second threshold level, determining the recommended quantity of the item for notification to the user based on the user product type quantity information and updating the user interface of the electronic device to notify the user of the recommended quantity of the item; and
  when the quantity of the second prior user transactions is determined to be greater than zero but not meet or exceed the second threshold level, determining the recommended quantity of the item for notification to the user based on the aggregate household product type quantity information and updating the user interface of the electronic device to notify the user of the recommended quantity of the item.

15. The method of claim 14, wherein determining the recommended quantity of the item for notification to the user based on the user product type quantity information comprises:
  selecting, as the recommended quantity, either a most frequently selected quantity of the one or more products of the type related to the item selected by the user, or a median selected quantity of the one or more products of the type related to the item selected by the user.

16. The method of claim 14, wherein determining the recommended quantity of the item for notification to the user based on the aggregate household product type quantity information comprises:
  determining a product type confidence interval for the aggregate household product type quantity information for the one or more products of the type related to the item for the household size corresponding to the respective household size of the user.

17. The method of claim 14, further comprising:
  determining whether a most frequently selected quantity of the one or more products of the type related to the item is within product type confidence interval for the one or more products of the type related to the item;
  when the most frequently selected quantity is determined to be within the product type confidence interval for the one or more products of the type related to the item, selecting, as the recommended quantity, the most frequently selected quantity of the one or more products of the type related to the item; and
  when the quantity of the first prior user transactions is determined to be zero and when a quantity of the second prior user transactions is determined to be zero, determining the recommended quantity of the item for notification to the user based on the aggregate household item quantity information or aggregate household product type quantity information and updating the user interface of the electronic device to notify the user of the recommended quantity of the item.

18. The method of claim 17, wherein determining the recommended quantity of the item for notification to the user based on the aggregate household item quantity information, comprises:
  determining whether the quantity of the first prior item transactions meets or exceeds a third threshold level; and
  when the quantity of the first prior item transactions is determined to meet or exceed the third threshold level, selecting, as the recommended quantity, either a most frequently selected quantity of the item selected by each user in the portion of the set of users in the first prior item transactions, or a median selected quantity of the item selected by each user in the portion of the set of users in the first prior item transactions.

19. The method of claim 18, wherein determining the recommended quantity of the item for notification to the user based on the aggregate household product type quantity information, comprises:
  when the quantity of the first prior item transactions by the portion of the set of users is determined to be greater than zero but does not meet or exceed the third threshold level, determining whether the quantity of the second prior item transactions meets or exceeds a fourth threshold level; and
  when the quantity of the second prior item transactions is determined to meet or exceed the fourth threshold level, selecting, as the recommended quantity, either a most frequently selected quantity of the one or more products of the type related to the item selected by each user in the portion of the set of users in the second prior item transactions, or a median selected quantity of the one or more products of the type related to the item selected by selected by each user in the portion of the set of users in the second prior item transactions.

20. The method of claim 11, further comprising:
  determining a cluster of products having product attributes related to the item; and
  when the quantity of the first prior user transactions is determined to be zero, determining the recommended quantity of the item for notification to the user based on quantities of products in the cluster of products selected by either the user or the portion of the set of users in a predetermined time period and updating the user interface of the electronic device to notify the user of the recommended quantity of the item.

* * * * *